United States Patent
Yaegashi et al.

(10) Patent No.: US 10,503,004 B2
(45) Date of Patent: Dec. 10, 2019

(54) POLARIZER

(71) Applicant: NITTO DENKO CORPORATION, Ibaraki-shi, Osaka (JP)

(72) Inventors: Masahiro Yaegashi, Ibaraki (JP); Shinobu Nagano, Ibaraki (JP); Shusaku Goto, Ibaraki (JP); Daisuke Ogomi, Ibaraki (JP); Yuki Nakano, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/735,264

(22) PCT Filed: Jun. 20, 2016

(86) PCT No.: PCT/JP2016/068248
§ 371 (c)(1),
(2) Date: Dec. 11, 2017

(87) PCT Pub. No.: WO2016/208535
PCT Pub. Date: Dec. 29, 2016

(65) Prior Publication Data
US 2018/0173050 A1    Jun. 21, 2018

(30) Foreign Application Priority Data
Jun. 25, 2015  (JP) ................. 2015-127755

(51) Int. Cl.
*G02F 1/1335* (2006.01)
*G02B 5/30* (2006.01)
(Continued)

(52) U.S. Cl.
CPC ......... *G02F 1/133528* (2013.01); *G02B 5/30* (2013.01); *G02B 5/3033* (2013.01); *H01L 51/5293* (2013.01); *H05B 33/02* (2013.01)

(58) Field of Classification Search
None
See application file for complete search history.

(56) References Cited

U.S. PATENT DOCUMENTS 5,327,285 A * 7/1994 Faris ............. G02B 27/0093
                                                      348/E5.141
8,467,177 B2    6/2013  Mathew et al.
(Continued)

FOREIGN PATENT DOCUMENTS

CN    101718885 A    6/2010
CN    102609038 A    7/2012
(Continued)

OTHER PUBLICATIONS

Third Party Observation dated Jul. 4, 2018, issued in counterpart Japanese Application No. 2015-127755, with English translation. (15 pages).
(Continued)

*Primary Examiner* — Phu Vu
(74) *Attorney, Agent, or Firm* — Westerman, Hattori, Daniels & Adrian, LLP

(57) ABSTRACT

There is provided a polarizer having a non-polarization portion that can achieve the multi-functionalization and high-functionalization of an electronic device, such as an image display apparatus, the polarizer being excellent in dimensional stability and external appearance of the non-polarization portion. A polarizer according to an embodiment of the present invention includes a resin film containing a dichromatic substance, wherein: the polarizer has a non-polarization portion at a predetermined position; and the non-polarization portion includes a thin-walled portion thinner than another portion of the resin film.

14 Claims, 7 Drawing Sheets

(51) Int. Cl.
*H01L 51/52* (2006.01)
*H05B 33/02* (2006.01)

(56) References Cited

U.S. PATENT DOCUMENTS

| | | | |
|---|---|---|---|
| 9,372,505 | B2 | 6/2016 | Mathew et al. |
| 10,359,553 | B2 | 7/2019 | Lee et al. |
| 2004/0212555 | A1 | 10/2004 | Falco |
| 2012/0106063 | A1 | 5/2012 | Mathew et al. |
| 2012/0206641 | A1 | 8/2012 | Baba |
| 2013/0265708 | A1 | 10/2013 | Mathew et al. |
| 2014/0118826 | A1 | 5/2014 | Jiao et al. |
| 2015/0301251 | A1* | 10/2015 | Hatanaka ........... B29D 11/0073 349/194 |
| 2016/0195653 | A1† | 7/2016 | Lee |
| 2016/0202403 | A1 | 7/2016 | Mathew et al. |
| 2016/0299271 | A1 | 10/2016 | Lee et al. |
| 2016/0299272 | A1 | 10/2016 | Lee et al. |
| 2016/0377777 | A1 | 12/2016 | Lee et al. |

FOREIGN PATENT DOCUMENTS

| | | | |
|---|---|---|---|
| CN | 105209944 | A | 12/2015 |
| JP | 48-64941 | A | 9/1973 |
| JP | 58-168019 | A | 10/1983 |
| JP | 2007-241314 | A | 9/2007 |
| JP | 2011-81315 | A | 4/2011 |
| JP | 2012-137738 | A | 7/2012 |
| JP | 2014-81482 | A | 5/2014 |
| JP | 2014081482 | A2 † | 5/2014 |
| JP | 2016-525725 | A | 8/2016 |
| JP | 2016-538599 | A | 12/2016 |
| KR | 10-2010-0125537 | A | 12/2010 |
| KR | 20100125537 | A † | 12/2010 |
| KR | 10-2012-0046035 | A | 5/2012 |
| KR | 10-2012-0118205 | A | 10/2012 |
| KR | 10-1293210 | B1 | 8/2013 |
| KR | 10-2015-0086159 | A | 7/2015 |
| KR | 10-2015-0111878 | A | 10/2015 |
| WO | 2015/108261 | A1 | 7/2015 |
| WO | 2015/147551 | A1 | 10/2015 |

OTHER PUBLICATIONS

Third Party Observation dated Jun. 20, 2018, issued in counterpart Korean application No. 10-2017-7036921, with English translation. (25 pages).

Office Action dated Oct. 22, 2018, issued in counterpart Korean application No. 10-2017-7036921, with English translation. (22 pages).

International Search Report dated Sep. 20, 2016, issued in counterpart application No. PCT/JP2016/068248, w/ English translation. (5 pages).

Office Action dated Jul. 2, 2019, issued in Japanese Patent Application No. 2015-127755 with English translation.

Office Action dated Aug. 5, 2019, issued in Chinese Patent Application No. 201680037352.1 with English translation.

\* cited by examiner
† cited by third party

FIG. 7
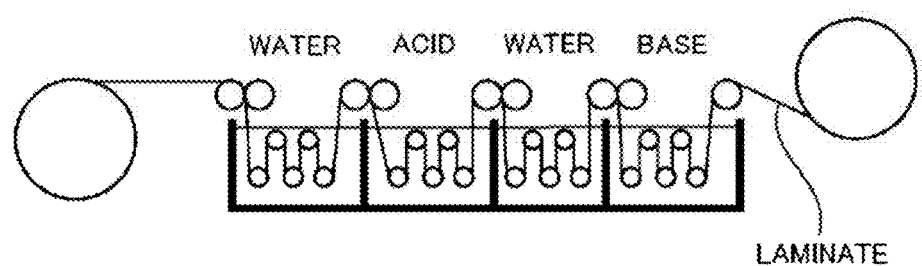
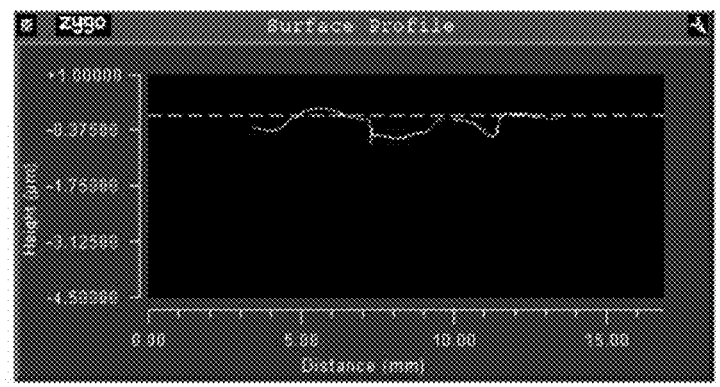
FIG. 8(a)
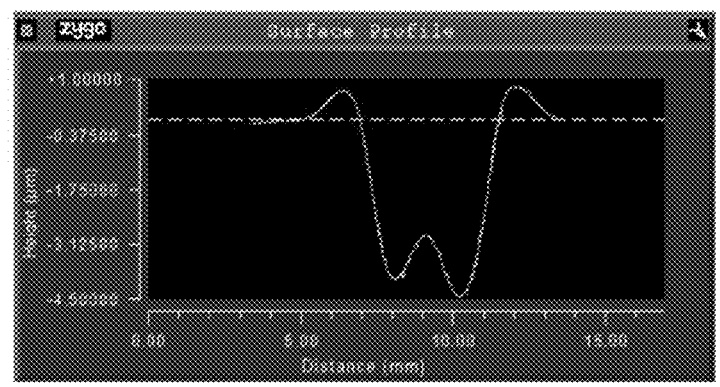
FIG. 8(b)

POLARIZER

TECHNICAL FIELD

The present invention relates to a polarizer, and more specifically, to a polarizer having a non-polarization portion.

BACKGROUND ART

Some of the image display apparatus of a cellular phone, a notebook personal computer (PC), and the like have mounted thereon internal electronic parts, such as a camera. Various investigations have been made for the purpose of improving, for example, the camera performance of any such image display apparatus (for example, Patent Literatures 1 to 7). However, an additional improvement in camera performance or the like has been desired in association with rapid widespread use of a smart phone and a touch panel-type information processing apparatus. In addition, a polarizing plate partially having polarization performance has been required in order to correspond to the diversification of the shapes of the image display apparatus and the high-functionalization thereof. In order to satisfy those requirements industrially and commercially, it has been desired that the image display apparatus and/or a part thereof be produced at acceptable cost. However, there remain various matters to be investigated for establishing such technology.

CITATION LIST

Patent Literature

[PTL 1] JP 2011-81315 A
[PTL 2] JP 2007-241314 A
[PTL 3] US 2004/0212555 A1
[PTL 4] KR 10-2012-0118205 A
[PTL 5] KR 10-1293210 B1
[PTL 6] JP 2012-137738 A
[PTL 7] US 2014/0118826 A1

SUMMARY OF INVENTION

Technical Problem

The present invention has been made to solve the above-mentioned problems, and a primary object of the present invention is to provide a polarizer having a non-polarization portion that can achieve the multi-functionalization and high-functionalization of an electronic device, such as an image display apparatus, the polarizer being excellent in dimensional stability and external appearance of the non-polarization portion.

Solution to Problem

A polarizer according to an embodiment of the present invention includes a resin film containing a dichromatic substance, wherein: the polarizer has a non-polarization portion at a predetermined position; and the non-polarization portion includes a thin-walled portion thinner than another portion of the resin film.

In one embodiment of the present invention, the non-polarization portion has a recessed portion having a recessed surface on one surface side of the resin film, and the recessed portion has a depth of 2 µm or less.

In one embodiment of the present invention, the polarizer has a thickness of 10 µm or less.

In one embodiment of the present invention, the non-polarization portion includes a low-concentration portion having a content of the dichromatic substance lower than that of the another portion of the resin film.

In one embodiment of the present invention, the content of the dichromatic substance of the non-polarization portion is 1.0 wt % or less.

In one embodiment of the present invention, the non-polarization portion has a content of the dichromatic substance of 1.0 wt % or less, and the recessed portion has a depth of 2 µm or less.

In one embodiment of the present invention, the non-polarization portion has a content of an alkali metal and/or an alkaline earth metal of 3.6 wt % or less.

In one embodiment of the present invention, the non-polarization portion has a transmittance of 50% or more.

In one embodiment of the present invention, the non-polarization portion has a transmittance of 90% or more, and the recessed portion has a depth of 2 µm or less.

In one embodiment of the present invention, the resin film includes a polyvinyl alcohol-based resin film containing iodine.

According to another aspect of the present invention, a polarizing plate is provided. The polarizing plate includes: the above-mentioned polarizer; and a protective film arranged on at least one side of the polarizer.

According to another aspect of the present invention, an image display apparatus is provided. The image display apparatus includes the above-mentioned polarizer or the above-mentioned polarizing plate, wherein the non-polarization portion is arranged at a position corresponding to a camera portion.

Advantageous Effects of Invention

According to the present invention, in the polarizer having a non-polarization portion that can achieve the multi-functionalization and high-functionalization of an electronic device, such as an image display apparatus, the thin-walled portion (step) to be formed in the non-polarization portion is controlled, and hence the polarizer excellent in dimensional stability and external appearance of the non-polarization portion can be provided. More specifically, the non-polarization portion is formed by a predetermined chemical decoloring treatment (typically, a treatment with a basic solution and a chemical treatment accompanying the treatment), and hence a non-polarization portion that has a high transmittance, that is suitably arranged at a position corresponding to, for example, a camera portion of an image display apparatus, and that is excellent in dimensional stability and external appearance can be formed. The inventors of the present invention have found that according to such chemical decoloring treatment, particularly in the case where the transmittance of the non-polarization portion is set to be high, the occurrence of a recess in the non-polarization portion cannot be avoided, and when the depth of the recess is excessively large, the recess may be viewed even after the recess has been filled with an adhesive or the like at the time of the formation of a polarizing plate. Further, the inventors of the present invention have found that when the depth of such recess is controlled (substantially, reduced), the viewing of the recess can be suppressed. Thus, the inventors have succeeded in securing the design property of the polarizer while maintaining such excellent characteristics of the non-polarization portion as described above. As described above, according to the present invention, the polarizer excellent in dimensional stability and external appearance of the non-polarization portion can be achieved.

BRIEF DESCRIPTION OF DRAWINGS

FIG. 7 is a schematic view for illustrating the formation of non-polarization portions in the method of producing a polarizer according to the embodiment of the present invention.

FIG. 8(a) is a graph for showing the result of the evaluation of surface smoothness in Example 1, and FIG. 8(b) is a graph for showing the result of the evaluation of surface smoothness in Example 2.

DESCRIPTION OF EMBODIMENTS

Embodiments of the present invention are described below. However, the present invention is not limited to these embodiments.

A. Polarizer

A-1. Entire Construction of Polarizer

Figure 1:
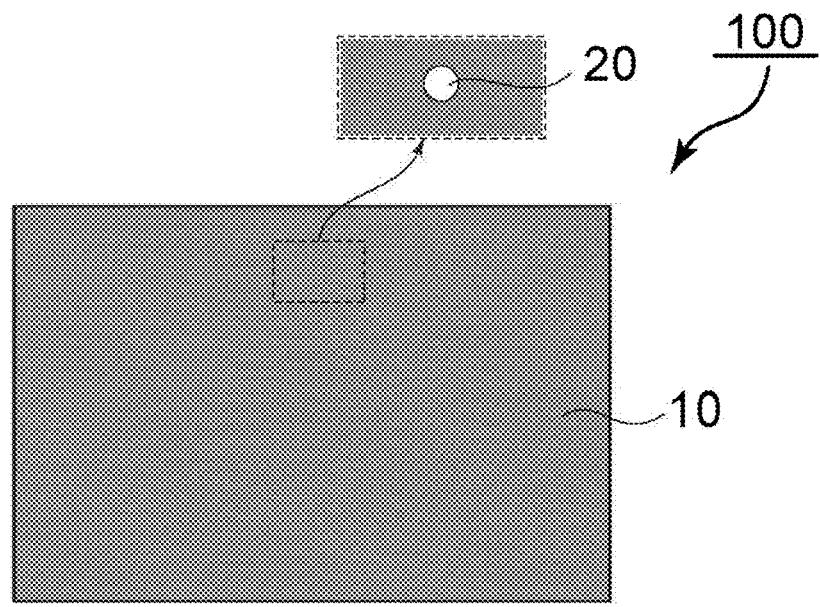
FIG. 1 is a schematic plan view of a polarizer according to one embodiment of the present invention.
Figure 2:
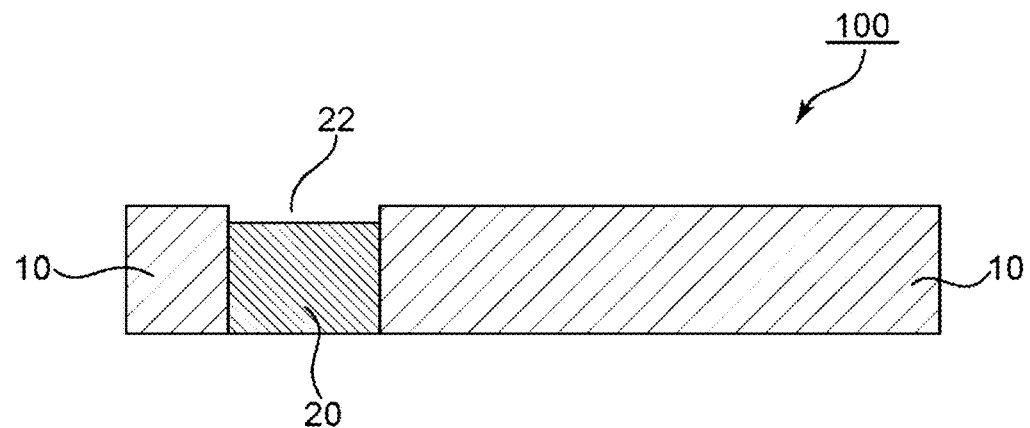
FIG. 2 is a schematic sectional view of the polarizer of FIG. 1.

FIG. 1 is a schematic plan view of a polarizer according to one embodiment of the present invention, and FIG. 2 is a schematic sectional view of the polarizer of FIG. 1. It should be noted that FIG. 1 and FIG. 2 are different from each other in scale and proportion. A polarizer 100 includes a resin film 10, and has a non-polarization portion 20 at a predetermined position. The resin film 10 contains a dichromatic substance. In the embodiment of the present invention, the non-polarization portion 20 is a thin-walled portion thinner than the other portion of the resin film. The non-polarization portion 20 typically has a recessed portion 22 having a recessed surface on one surface side of the resin film 10. The depth of the recessed portion 22 is 2 μm or less.

The polarizer (excluding the non-polarization portion) preferably shows absorption dichroism at any wavelength in the wavelength range of from 380 nm to 780 nm. The single layer transmittance (Ts) of the polarizer (excluding the non-polarization portion) is preferably 39% or more, more preferably 39.5% or more, still more preferably 40% or more, particularly preferably 40.5% or more. A theoretical upper limit for the single layer transmittance is 50%, and a practical upper limit therefor is 46%. In addition, the single layer transmittance (Ts) is a Y value measured with the two-degree field of view (C light source) of JIS Z 8701 and subjected to visibility correction, and can be measured with, for example, a microspectroscopic system (manufactured by Lambda Vision Inc., LVmicro). The polarization degree of the polarizer (excluding the non-polarization portion) is preferably 99.9% or more, more preferably 99.93% or more, still more preferably 99.95% or more.

A-2. Resin Film

Any appropriate resin film that may be used as a polarizer may be adopted as the resin film 10. The resin film 10 is typically a polyvinyl alcohol-based resin (hereinafter referred to as "PVA-based resin") film.

Any appropriate resin may be used as a PVA-based resin forming the PVA-based resin film. Examples thereof include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree can be determined in conformity with JIS K 6726-1994. The use of a PVA-based resin having such saponification degree can provide a polarizer excellent in durability. When the saponification degree is excessively high, the resin may gel.

The average polymerization degree of the PVA-based resin may be appropriately selected in accordance with purposes. The average polymerization degree is typically from 1,000 to 10,000, preferably from 1, 200 to 4, 500, more preferably from 1, 500 to 4, 300. The average polymerization degree can be determined in conformity with JIS K 6726-1994.

Examples of the dichromatic substance in the resin film include iodine and an organic dye. Those substances may be used alone or in combination thereof. Of those, iodine is preferably used. This is because of the following reason: when the non-polarization portion is formed by, for example, decoloring based on a chemical treatment, an iodine complex in the resin film (polarizer) is appropriately reduced, and hence a non-polarization portion having appropriate characteristics at the time of use in, for example, a camera portion can be formed.

The thickness of the resin film (as a result, the polarizer) is preferably 10 μm or less, more preferably 8 μm or less, still more preferably 6 μm or less, particularly preferably 5 μm or less. Meanwhile, the thickness is preferably 0.5 μm or more, more preferably 1 μm or more. With such thickness, a polarizer having excellent durability and excellent optical characteristics can be obtained. In addition, as the thickness becomes smaller, the non-polarization portion can be more satisfactorily formed. When the non-polarization portion is formed by, for example, decoloring based on a chemical treatment, the time period for which a decoloring liquid and the resin film (polarizer) are brought into contact with each other can be shortened. Specifically, the non-polarization portion can be formed in a shorter time period. Further, the thickness of a portion with which the decoloring liquid (e.g., a basic solution) is brought into contact becomes smaller than that of the other portion, and hence a step may be formed in some cases. However, such step can be reduced by reducing the thickness of the resin film. As a result, such an inconvenience that the recessed portion is viewed can be suppressed. In more detail, as a result of their wide range of investigations, the inventors of the present invention have found that when an attempt is made to increase the transmittance of the non-polarization portion through decoloring, a recessed portion having a depth of, for example, about 20% of the thickness of the resin film is formed. Further, the inventors of the present invention have found that not the ratio of the depth of the recessed portion to the thickness of the resin film but the absolute value of the depth of the recessed portion affects the external appearance of the polarizer (typically, the visibility of the recessed portion). Therefore, the absolute value of the depth of the recessed portion can be reduced by reducing the thickness of the resin film, and as a result, the influence on the external appearance can be suppressed. Such effect is an excellent effect that is obtained only after a technology involving forming the non-polarization portion (in particular, a non-polarization portion having a high transmittance) through the decoloring based on the chemical treatment is applied to an extremely thin polarizer.

A-3. Non-Polarization Portion

As described above, the non-polarization portion 20 is a thin-walled portion thinner than the other portion. The non-polarization portion 20 typically has the recessed portion 22 having a recessed surface on one surface side of the resin film 10. In this case, a step between the non-polarization portion and the other portion (depth of the recessed portion) is, for example, 0.02 µm or more. Meanwhile, the step is preferably 2 µm or less, more preferably 1 µm or less. When the non-polarization portion is formed by decoloring to be described later, such step may be formed. However, when an upper limit for the step falls within such range, the influence on the external appearance is satisfactorily suppressed. The term. "step (depth of the recessed portion)" as used herein refers to the depth of the deepest portion of the recessed portion.

The recessed portion having a recessed surface on one surface side is formed by, for example, causing a decoloring liquid to be described later to act only from one surface side of the polarizer (polarizer intermediate). When the depth of the recessed portion to be formed after the decoloring treatment is set within the above-mentioned range, a treatment after the decoloring to be described later can be uniformly performed. In addition, the recessed portion can be formed only on one surface side, and hence the influence on the external appearance can be further suppressed.

The non-polarization portion is preferably a low-concentration portion having a relatively low content of the dichromatic substance. Specifically, the portion is a low-concentration portion having a content of the dichromatic substance lower than that of any other portion. According to such construction, a problem in terms of quality, such as cracking, delamination (interlayer peeling), or adhesive protrusion, is avoided as compared to the case where the non-polarization portion is formed mechanically (e.g., by a method involving mechanically punching out the portion through the use of chisel punching, a plotter, a water jet, or the like). In addition, the content of the dichromatic substance itself in the low-concentration portion is low, and hence the transparency of the non-polarization portion is satisfactorily maintained as compared to the case where the non-polarization portion is formed by decomposing the dichromatic substance with laser light or the like.

The low-concentration portion is a portion having a content of the dichromatic substance lower than that of the other portion. The content of the dichromatic substance in the low-concentration portion is preferably 1.0 wt % or less, more preferably 0.5 wt % or less, still more preferably 0.2 wt % or less. When the content of the dichromatic substance in the low-concentration portion falls within such range, desired transparency can be sufficiently imparted to the low-concentration portion. When the low-concentration portion is caused to correspond to, for example, a camera portion of an image display apparatus, photographing performance that is extremely excellent from both the viewpoints of brightness and a tinge can be realized. Meanwhile, a lower limit for the content of the dichromatic substance in the low-concentration portion is typically equal to or less than a detection limit. When iodine is used as the dichromatic substance, the iodine content is determined from, for example, a calibration curve produced in advance from an X-ray intensity measured by X-ray fluorescence analysis through the use of a standard sample.

A difference between the content of the dichromatic substance in the other portion and the content of the dichromatic substance in the low-concentration portion is preferably 0.5 wt % or more, more preferably 1 wt % or more. When the difference between the contents falls within such range, a low-concentration portion having desired transparency can be formed.

The content of an alkali metal and/or an alkaline earth metal in the low-concentration portion is 3.6 wt % or less, preferably 2.5 wt % or less, more preferably 1.0 wt % or less, still more preferably 0.5 wt % or less. When the content of the alkali metal and/or the alkaline earth metal in the low-concentration portion falls within such range, the shape of the low-concentration portion formed by contact with a basic solution to be described later can be satisfactorily maintained (i.e., a low-concentration portion having excellent dimensional stability can be achieved). The content can be determined from, for example, a calibration curve produced in advance from an X-ray intensity measured by X-ray fluorescence analysis through the use of a standard sample. Such content can be achieved by reducing the amount of the alkali metal and/or the alkaline earth metal in a contact portion in the contact with the basic solution to be described later.

The transmittance of the non-polarization portion (e.g., a transmittance measured with light having a wavelength of 550 nm at 23° C.) is preferably 50% or more, more preferably 60% or more, still more preferably 75% or more, particularly preferably 90% or more. With such transmittance, the low-concentration portion has desired transparency. As a result, when the polarizer is arranged so as to correspond to a camera portion of an image display apparatus, an adverse effect on the photographing performance of the camera can be prevented.

In the illustrated example, the non-polarization portion 20 having a small circular shape is formed in a central portion in the upper end portion of the resin film 10. However, the arrangement, shape, size, and the like of the non-polarization portion may be appropriately designed. The design is performed in accordance with, for example, the position, shape, and size of a camera portion of an image display apparatus on which the polarizer is mounted. Specifically, the design is performed so that the non-polarization portion may not correspond to the display screen of the image display apparatus on which the polarizer is mounted.

Any appropriate shape may be adopted as the plan-view shape of the non-polarization portion 20 as long as the camera performance of the image display apparatus in which the polarizer is used is not adversely affected. Specific examples thereof include a circular shape, an elliptical shape, a square, a rectangle, and a rhombus. A non-polarization portion having a desired plan-view shape can be formed by appropriately setting the shape of a through-hole of a surface protective film to be described later in the section C.

The embodiment in which the polarizer has a sheet shape has been described above, but in another embodiment, the polarizer of the present invention may have an elongated shape. The sheet-shaped polarizer can be obtained by cutting an elongated polarizer into a predetermined size or by being cut out of the elongated polarizer. The elongated polarizer is described below.

Figure 3:
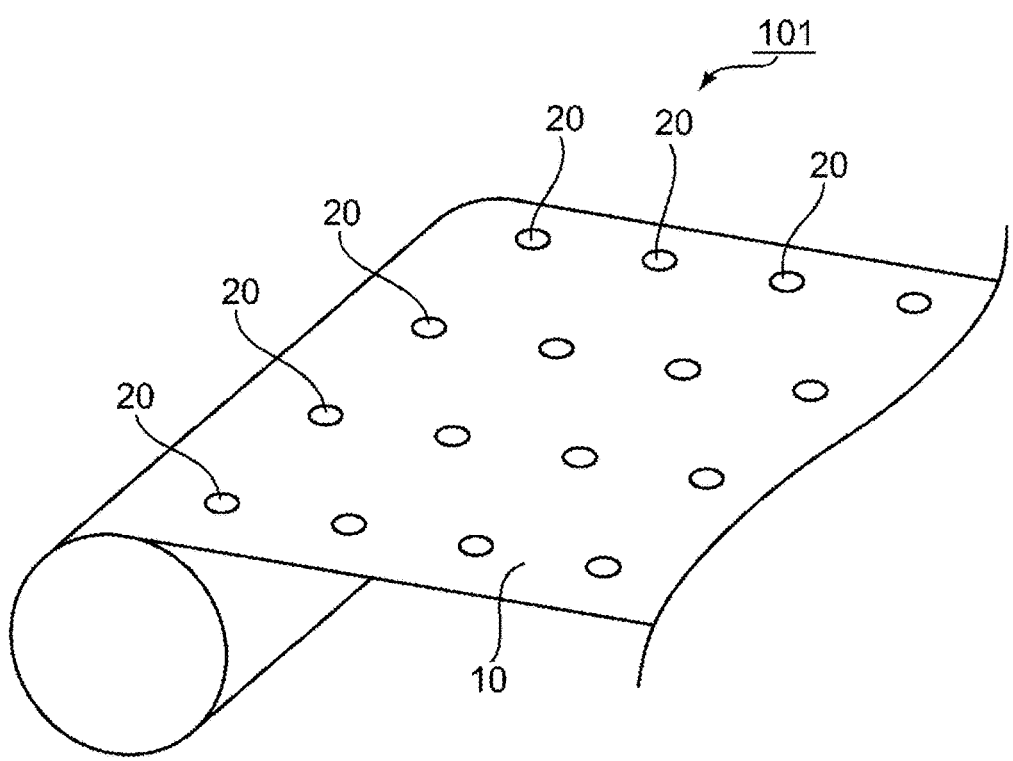
FIG. 3 is a schematic perspective view of a polarizer according to another embodiment of the present invention.

FIG. 3 is a schematic perspective view of the elongated polarizer. An elongated polarizer 101 is typically wound in a roll shape as illustrated in FIG. 3. The term. "elongated" as used herein means such a slender shape that its length is sufficiently long as compared to its width, and includes, for example, such a slender shape that its length is 10 or more times, preferably 20 or more times as long as its width. The polarizer 101 has the non-polarization portions 20 arranged at predetermined intervals in its lengthwise direction and/or its widthwise direction (i.e., according to a predetermined pattern). The arrangement pattern of the non-polarization portions 20 may be appropriately set in accordance with purposes. The non-polarization portions 20 are each typically arranged at a position corresponding to a camera portion of an image display apparatus having a predetermined size at the time of the cutting of the polarizer 101 into a predetermined size (e.g., cutting or punching in the lengthwise direction and/or the widthwise direction) for its attachment to the image display apparatus. Therefore, when polarizers having only one size are cut out of the one elongated polarizer 101, the non-polarization portions 20 may be arranged at substantially equal intervals in each of the lengthwise direction and the widthwise direction as illustrated in FIG. 3. With such construction, the cutting of the polarizer into the predetermined size in accordance with the size of the image display apparatus is easily controlled, and hence a yield can be improved. Further, variations in positions of the non-polarization portions in the sheet-shaped polarizers cut out of the elongated polarizer can be suppressed. The phrase "substantially equal intervals in each of the lengthwise direction and the widthwise direction" means that intervals in the lengthwise direction are substantially equal to each other, and intervals in the widthwise direction are substantially equal to each other, and the intervals in the lengthwise direction and the intervals in the widthwise direction are not needed to be equal to each other. For example, when the intervals in the lengthwise direction are each represented by L1, and the intervals in the widthwise direction are each represented by L2, the L1 may be equal to the L2, or the L1 may not be equal to the L2. When polarizers having a plurality of sizes are cut out of the one elongated polarizer 101, the intervals between the non-polarization portions 20 in the lengthwise direction and/or the widthwise direction can be changed in accordance with the sizes of the polarizers to be cut out of the elongated polarizer. For example, the non-polarization portions 20 may be arranged at substantially equal intervals in the lengthwise direction and arranged at different intervals in the widthwise direction, or may be arranged at different intervals in the lengthwise direction and arranged at substantially equal intervals in the widthwise direction. When the non-polarization portions are arranged at different intervals in the lengthwise direction or the widthwise direction, all of intervals between adjacent non-polarization portions may be different from each other, or only part of the intervals (specific intervals between the adjacent non-polarization portions) may be different from each other. In addition, the following may be performed: a plurality of regions are specified in the lengthwise direction of the polarizer 101, and the intervals between the non-polarization portions 20 in the lengthwise direction and/or the widthwise direction are set for each of the regions. Thus, the non-polarization portions can be formed in the elongated polarizer according to any appropriate arrangement pattern in accordance with purposes.

Figure 4A:
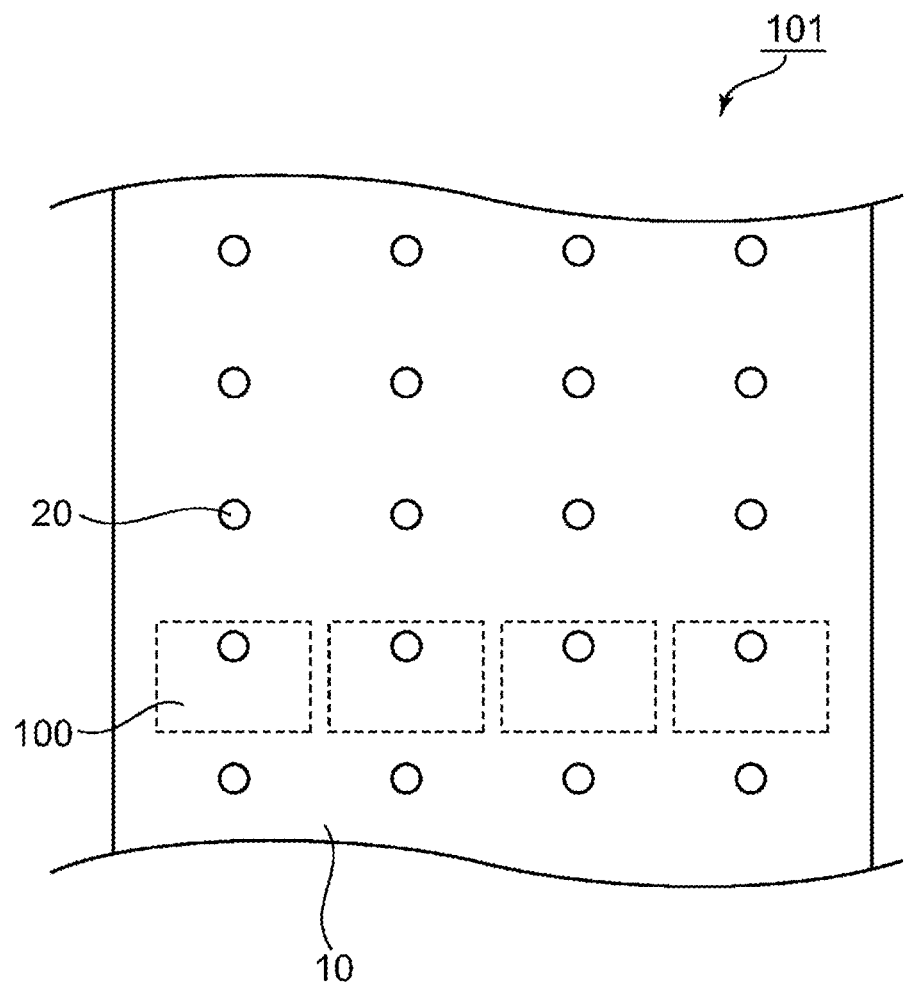
FIG. 4A is a schematic plan view for illustrating an example of the arrangement pattern of non-polarization portions in an elongated polarizer according to the embodiment of the present invention.
Figure 4B:
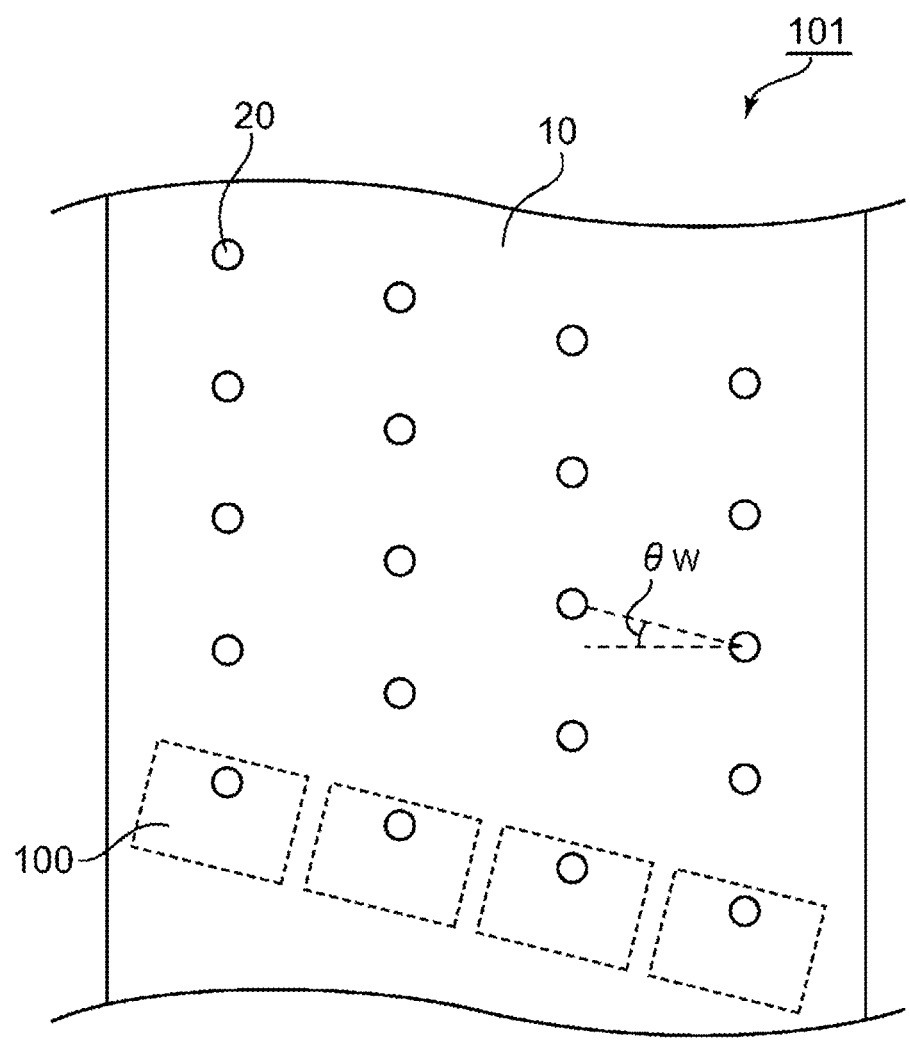
FIG. 4B is a schematic plan view for illustrating another example of the arrangement pattern of non-polarization portions in the elongated polarizer according to the embodiment of the present invention.
Figure 4C:
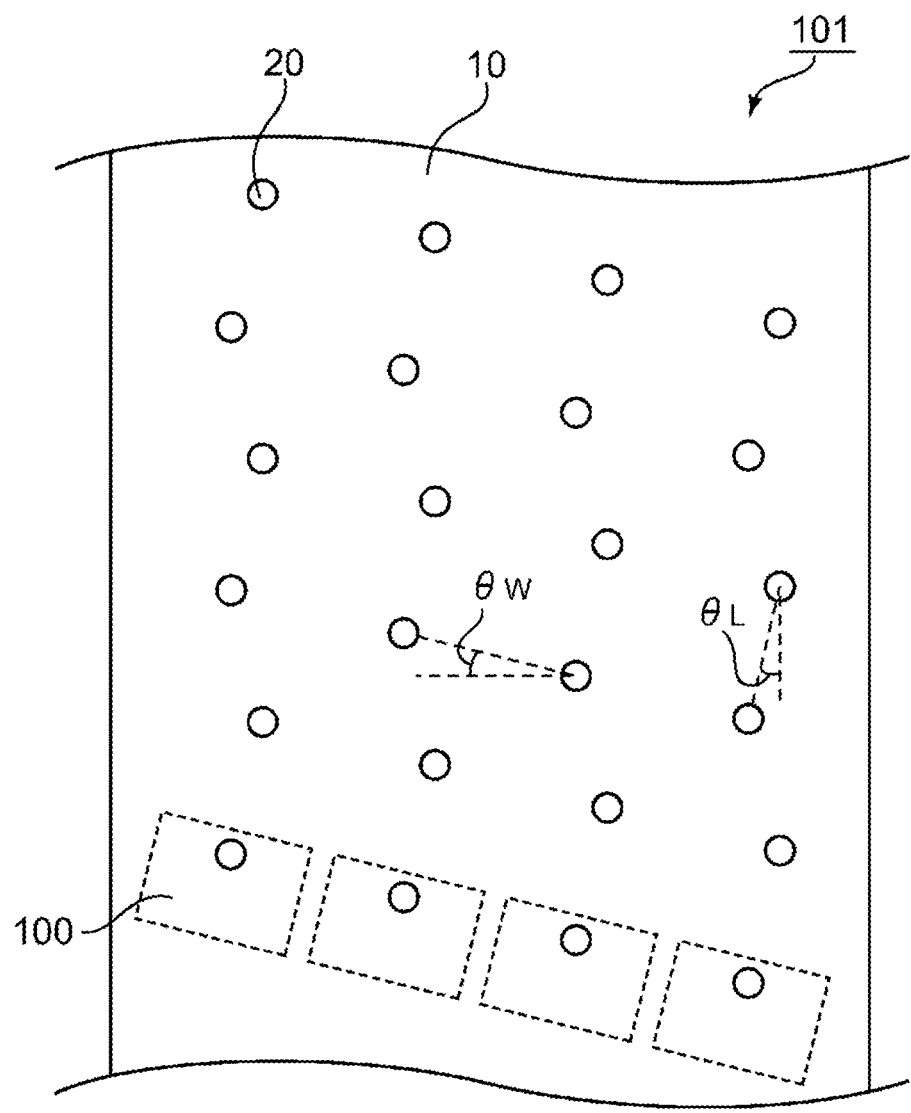
FIG. 4C is a schematic plan view for illustrating still another example of the arrangement pattern of non-polarization portions in the elongated polarizer according to the embodiment of the present invention.

FIG. 4A is a schematic plan view for illustrating an example of the arrangement pattern of the non-polarization portions in the polarizer according to the embodiment of the present invention, FIG. 4B is a schematic plan view for illustrating another example of the arrangement pattern of the non-polarization portions, and FIG. 4C is a schematic plan view for illustrating still another example of the arrangement pattern of the non-polarization portions. In one embodiment, as illustrated in FIG. 4A, the non-polarization portions 20 are arranged so that a straight line connecting adjacent non-polarization portions in the lengthwise direction of the polarizer may be substantially parallel to the lengthwise direction, and a straight line connecting adjacent non-polarization portions in the widthwise direction thereof may be substantially parallel to the widthwise direction. This embodiment corresponds to the arrangement pattern of the non-polarization portions in the polarizer illustrated in FIG. 3. In another embodiment, as illustrated in FIG. 4B, the non-polarization portions 20 are arranged so that the straight line connecting the adjacent non-polarization portions in the lengthwise direction may be substantially parallel to the lengthwise direction, and the straight line connecting the adjacent non-polarization portions in the widthwise direction may have a predetermined angle $\theta_W$ with respect to the widthwise direction. In still another embodiment, as illustrated in FIG. 4C, the non-polarization portions 20 are arranged so that the straight line connecting the adjacent non-polarization portions in the lengthwise direction may have a predetermined angle $\theta_L$ with respect to the lengthwise direction, and the straight line connecting the adjacent non-polarization portions in the widthwise direction may have the predetermined angle $\theta_W$ with respect to the widthwise direction. The $\theta_L$ and/or $\theta_W$ is preferably more than 0° and within ±10°. The symbol "±" as used herein means that both a clockwise direction and a counterclockwise direction with respect to a reference direction (the lengthwise direction or the widthwise direction) are included. The embodiments illustrated in FIG. 4B and FIG. 4C each have the following advantage. In a certain image display apparatus, in order that its display characteristics may be improved, the absorption axis of its polarizer is required to be arranged so as to deviate from the long side or short side of the apparatus by up to about 10° in some cases. As described later, the absorption axis of the polarizer is expressed in its lengthwise direction or its widthwise direction. Accordingly, with such construction as described above, in such cases, the direction of the absorption axis of each of the sheet-shaped polarizers 100 cut out of the polarizer 101 can be precisely controlled to a desired angle, and a variation in direction of the absorption axis between the polarizers 100 can be significantly suppressed. Needless to say, the arrangement pattern of the non-polarization portions is not limited to the illustrated examples. For example, the non-polarization portions 20 may be arranged so that the straight line connecting the adjacent non-polarization portions in the lengthwise direction may have the predetermined angle $\theta_L$ with respect to the lengthwise direction, and the straight line connecting the adjacent non-polarization portions in the widthwise direction may be substantially parallel to the widthwise direction.

In addition, the following may be performed: a plurality of regions are specified in the lengthwise direction of the polarizer 101, and the $\theta_L$ and/or $\theta_W$ is set for each of the regions.

The absorption axis of the elongated polarizer may be set to any appropriate direction in accordance with purposes. The direction of the absorption axis may be, for example, the lengthwise direction or the widthwise direction. A polarizer having an absorption axis in its lengthwise direction has an advantage in that the polarizer is excellent in production efficiency. A polarizer having an absorption axis in its widthwise direction has an advantage in that the polarizer can be laminated together with, for example, a retardation film having a slow axis in its lengthwise direction by a so-called roll-to-roll process. In one embodiment, the absorption axis is substantially parallel to the lengthwise direction or the widthwise direction, and both end portions of the polarizer are subjected to slitting parallel to the lengthwise direction. With such construction, when a slitting operation is performed with reference to an end surface of the polarizer, a plurality of polarizers each having a non-polarization portion and each having an absorption axis in an appropriate direction can be easily produced.

When the non-polarization portion has a recessed portion, an inconvenience that is considered to be capable of occurring in the elongated polarizer occurs. Possible examples of such inconvenience include: a possibility that when the elongated polarizer is wound in a roll shape, the recessed portion is transferred as a winding trace onto a portion where different sites of the polarizer are superimposed on each other; and a possibility that air bubbles occur owing to an influence of the recessed portion at the time of the bonding of the polarizer and any other constituent member, such as a protective film. It is conceivable that such inconvenience can be suppressed by reducing the depth of the recessed portion as described above. It is conceivable that as a result, a variation in quality between sheet-shaped polarizers obtained from the elongated polarizer that may result from such inconvenience can be suppressed.

B. Polarizing Plate

Figure 5:
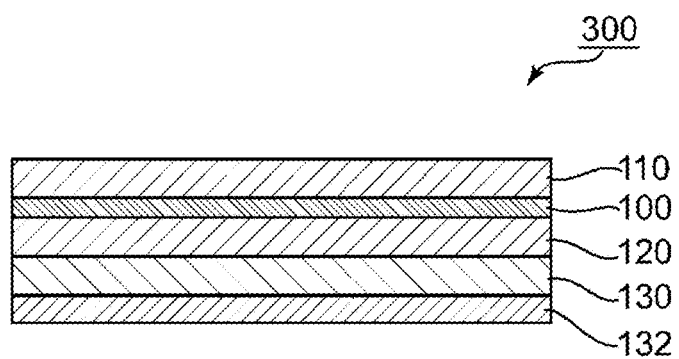
FIG. 5 is a schematic sectional view of a polarizing plate according to one embodiment of the present invention.

The polarizer 100 can be practically provided as a polarizing plate. Therefore, the present invention can also provide a polarizing plate. FIG. 5 is a schematic sectional view of a polarizing plate according to one embodiment of the present invention. In FIG. 5, the recessed portion 22 is omitted. A polarizing plate 300 includes the polarizer 100, and protective films 110 and 120 arranged on both sides of the polarizer 100. Although the protective films are arranged on both sides of the polarizer in the illustrated example, a protective film may be arranged only on one side thereof. As materials for forming the protective film, there are given, for example, a cellulose-based resin, such as diacetyl cellulose or triacetyl cellulose, a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. One of the protective films 110 and 120 may be omitted in accordance with purposes and a desired construction. The simple term "protective film" as used herein means a polarizer protective film like each of the protective films 110 and 120, and is different from a surface protective film (film configured to temporarily protect the polarizing plate at the time of an operation) to be described in the section C. In the illustrated example, the polarizing plate including the sheet-shaped polarizer 100 (i.e., a sheet-shaped polarizing plate) is described, but the polarizing plate may have a sheet shape or may have an elongated shape. The elongated polarizing plate can be obtained by laminating an elongated polarizer and an elongated protective film through, for example, the roll-to-roll process. The sheet-shaped polarizing plate may be obtained by laminating a sheet-shaped protective film on the sheet-shaped polarizer, or may be cut out of the elongated polarizing plate so as to have a predetermined size.

The thickness of the protective film is typically from 10 μm to 100 μm. The protective film is typically laminated on the polarizer through intermediation of an adhesion layer (specifically an adhesive layer or a pressure-sensitive adhesive layer). The adhesive layer is typically formed of a PVA-based adhesive or an active energy ray-curable adhesive. The pressure-sensitive adhesive layer is typically formed of an acrylic pressure-sensitive adhesive. In one embodiment, the thickness of the protective film is 80 μm or less. The use of a protective film having such thickness can contribute to the thinning of the polarizing plate to be obtained. In the embodiment in which the polarizing plate has an elongated shape, when an elongated polarizing plate obtained by arranging a protective film having such thickness on the other surface side of the polarizer having the recessed portion formed on the one surface side is wound in a roll shape, an inconvenience, such as the transfer of the recessed portion as a winding trace onto the protective film, may be liable to occur. In such embodiment, a merit of reducing the depth of the recessed portion can be significantly obtained.

The polarizing plate 300 practically includes a pressure-sensitive adhesive layer 130 as an outermost layer. The pressure-sensitive adhesive layer 130 typically serves as an outermost layer on an image display apparatus side. A separator 132 is temporarily bonded to the pressure-sensitive adhesive layer 130 in a peelable manner to protect the pressure-sensitive adhesive layer until the layer is actually used, and to enable roll forming.

The polarizing plate 300 may further include any appropriate optical functional layer in accordance with purposes. Typical examples of the optical functional layer include a retardation film (optical compensation film) and a surface-treated layer. For example, a retardation film may be arranged between the protective film 120 and the pressure-sensitive adhesive layer 130 (not shown). The optical characteristics (e.g., a refractive index ellipsoid, an in-plane retardation, and a thickness direction retardation) of the retardation film may be appropriately set in accordance with, for example, purposes and the characteristics of an image display apparatus. For example, when the image display apparatus is a liquid crystal display apparatus of an IPS mode, a retardation film having a refractive index ellipsoid of nx>ny>nz and a retardation film having a refractive index ellipsoid of nz>nx>ny may be arranged. The retardation film may also serve as a protective film. In this case, the protective film 120 may be omitted. In contrast, the protective film 120 may have an optical compensation function (i.e., the film may have an appropriate refractive index ellipsoid, an appropriate in-plane retardation, and an appropriate thickness direction retardation that are in accordance with purposes). The symbol "nx" represents a refractive index in the direction in which a refractive index in a film surface becomes maximum (i.e., a slow axis direction), the symbol "ny" represents a refractive index in a direction perpendicular to the slow axis in the film plane, and the symbol "nz" represents a refractive index in a thickness direction.

A surface-treated layer may be arranged outside the protective film 110 (not shown). Typical examples of the surface-treated layer include a hard coat layer, an antireflection layer, and an anti-glare layer. The surface-treated layer is preferably, for example, a layer having a low moisture permeability for the purpose of improving the humidification durability of the polarizer. The hard coat layer is arranged for the purpose of, for example, preventing the surface of the polarizing plate from being flawed. The hard coat layer may be formed by, for example, a system involving adding, to the surface, a cured coating film based on an appropriate UV-curable resin, such as an acrylic UV-curable resin or a silicone-based UV-curable resin, the cured coating film being excellent in hardness, sliding characteristic, and the like. The hard coat layer preferably has a pencil hardness of 2H or more. The antireflection layer is a low-reflection layer to be arranged for the purpose of preventing the reflection of ambient light on the surface of the polarizing plate. Examples of the antireflection layer include a thin-layer type disclosed in JP 2005-248173 A that prevents the reflection through the utilization of a reflected light-canceling effect exhibited by an optical interferential action and a surface structure type disclosed in JP 2011-2759 A that provides the surface with a fine structure to express a low reflectance. The anti-glare layer is arranged for the purpose of, for example, preventing the inhibition of the viewing of light transmitted through the polarizing plate due to the reflection of the ambient light on the surface of the polarizing plate. The anti-glare layer is formed by, for example, providing the surface with a fine uneven structure according to an appropriate system, such as a surface-roughening system based on a sandblast system or an embossing system, or a system involving compounding transparent fine particles. The anti-glare layer may also serve as a diffusion layer (e.g., a viewing angle-broadening function) for diffusing the light transmitted through the polarizing plate to broaden a viewing angle or the like. The surface of the protective film 110 may be subjected to a similar surface treatment instead of the arrangement of the surface-treated layer.

C. Method of Producing Polarizer

A method of producing a polarizer of the present invention is described below. For convenience, a method of producing an elongated polarizer is described. A sheet-shaped polarizer can be obtained by cutting the resultant elongated polarizer into a predetermined size.

C-1. Production of Polarizer

A resin film (typically a PVA-based resin film) constituting the polarizer may be a single film, or may be a resin layer (typically a PVA-based resin layer) formed on a resin substrate. The PVA-based resin layer may be formed by applying an application liquid containing a PVA-based resin onto the resin substrate, or may be formed by laminating the PVA-based resin film onto the resin substrate. The case where the polarizer is the PVA-based resin layer formed on the resin substrate is specifically described below. Here, the case where the PVA-based resin layer is formed by application is described, but the same holds true for the case where the PVA-based resin film is laminated. In the case where the polarizer is a single PVA-based resin film, the polarizer may be produced by a method well-known and commonly used in the art, and hence detailed description of the case is omitted.

C-1-1. Production of Laminate of Resin Substrate and PVA-Based Resin Layer

First, a laminate of the resin substrate and the PVA-based resin layer is produced by applying the application liquid containing the PVA-based resin onto the resin substrate, and drying the liquid to form the PVA-based resin layer.

Any appropriate thermoplastic resin may be adopted as a formation material for the resin substrate. Examples of the thermoplastic resin include: an ester-based resin, such as a polyethylene terephthalate-based resin; a cycloolefin-based resin, such as a norbornene-based resin; an olefin-based resin, such as polypropylene; a polyamide-based resin; a polycarbonate-based resin; and copolymer resins thereof. Of those, a norbornene-based resin and an amorphous polyethylene terephthalate-based resin are preferred.

In one embodiment, an amorphous (uncrystallized) polyethylene terephthalate-based resin is preferably used. In particular, a non-crystalline (hardly crystallizable) polyethylene terephthalate-based resin is preferably used. Specific examples of the non-crystalline polyethylene terephthalate-based resin include: a copolymer further containing isophthalic acid as a dicarboxylic acid; and a copolymer further containing cyclohexanedimethanol as a glycol.

When an underwater stretching mode is adopted in stretching to be described later, the resin substrate absorbs water and the water can function like a plasticizer to plasticize the substrate. As a result, a stretching stress can be significantly reduced and hence the laminate can be stretched at a high ratio. Accordingly, stretchability more excellent than that at the time of in-air stretching can be achieved. As a result, a polarizer having excellent optical characteristics can be produced. In one embodiment, the water absorption ratio of the resin substrate is preferably 0.2% or more, more preferably 0.3% or more. Meanwhile, the water absorption ratio of the resin substrate is preferably 3.0% or less, more preferably 1.0% or less. The use of such resin substrate can prevent an inconvenience, such as the deterioration of the external appearance of the polarizer to be obtained due to a remarkable reduction in dimensional stability at the time of the production. In addition, the use can prevent the rupture of the substrate at the time of underwater stretching and the peeling of the PVA-based resin layer from the resin substrate. The water absorption ratio of the resin substrate may be adjusted by, for example, introducing a modification group into the formation material or using a crystallized material as the formation material and heating the material. The water absorption ratio is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, in consideration of the plasticization of the resin substrate by water and satisfactory performance of the underwater stretching, the glass transition temperature is more preferably 120° C. or less. In one embodiment, the glass transition temperature of the resin substrate is preferably 60° C. or more. The use of such resin substrate prevents an inconvenience, such as the deformation (e.g., the occurrence of unevenness, a sag, or a wrinkle) of the resin substrate at the time of the application and drying of the application liquid containing the PVA-based resin, and hence enables satisfactory production of the laminate. In addition, the use enables satisfactory performance of the stretching of the PVA-based resin layer at a suitable temperature (e.g., about 60° C.). In another embodiment, the glass transition temperature may be lower than 60° C. as long as the resin substrate does not deform at the time of the application and drying of the application liquid containing the PVA-based resin. The glass transition temperature of the resin substrate may be adjusted by, for example, introducing a modification group into the formation material or using a crystallized material as the formation material and heating the material. The glass transition temperature (Tg) is a value determined in conformity with JIS K 7121.

The thickness of the resin substrate before the stretching is preferably from 20 µm to 300 µm, more preferably from 50 µm to 200 µm. When the thickness is less than 20 µm, it may become difficult to form the PVA-based resin layer. When the thickness is more than 300 µm, there is a risk in that in, for example, the underwater stretching, a long time period is required for the resin substrate to absorb water, and an excessively large load is required for the stretching.

The PVA-based resin forming the PVA-based resin layer is as described in the section A.

The application liquid is typically a solution in which the PVA-based resin is dissolved in a solvent. Examples of the solvent include water, dimethyl sulfoxide, dimethylformamide, dimethylacetamide, N-methylpyrrolidone, various glycols, polyhydric alcohols, such as trimethylolpropane, and amines, such as ethylenediamine and diethylenetriamine. Those solvents may be used alone or in combination thereof. Of those, water is preferred. The PVA-based resin concentration of the solution is preferably from 3 parts by weight to 20 parts by weight with respect to 100 parts by weight of the solvent. Such resin concentration enables the formation of a uniform applied film closely adhering to the resin substrate.

The application liquid may be compounded with an additive. Examples of the additive include a plasticizer and a surfactant. Examples of the plasticizer include polyhydric alcohols, such as ethylene glycol and glycerin. Examples of the surfactant include a nonionic surfactant. Any such additive may be used for the purpose of further improving the uniformity, dyeability, and stretchability of the PVA-based resin layer to be obtained.

Any appropriate method may be adopted as a method of applying the application liquid. Examples thereof include a roll coating method, a spin coating method, a wire bar coating method, a dip coating method, a die coating method, a curtain coating method, a spray coating method, and a knife coating method (such as a comma coating method).

The temperature at which the application liquid is applied and dried is preferably 50° C. or more.

The thickness of the PVA-based resin layer before the stretching is preferably from 3 µm to 40 µm, more preferably from 3 µm to 20 µm.

Before the formation of the PVA-based resin layer, the resin substrate may be subjected to a surface treatment (e.g., a corona treatment), or an easy-adhesion layer may be formed on the resin substrate. The performance of any such treatment can improve adhesiveness between the resin substrate and the PVA-based resin layer.

C-1-2. Stretching of Laminate

Any appropriate method may be adopted as a method of stretching the laminate. Specifically, fixed-end stretching may be adopted, or free-end stretching (e.g., a method involving passing the laminate between rolls having different peripheral speeds to uniaxially stretch the laminate) may be adopted. Of those, free-end stretching is preferred.

The stretching direction of the laminate may be appropriately set. In one embodiment, the stretching is performed in the lengthwise direction of an elongated laminate. As a result, the absorption axis of the polarizer to be obtained can be expressed in the lengthwise direction. In this case, the method involving passing the laminate between the rolls having different peripheral speeds to stretch the laminate is typically adopted. In another embodiment, the stretching is performed in the widthwise direction of the elongated laminate. As a result, the absorption axis of the polarizer to be obtained can be expressed in the widthwise direction. In this case, a method involving stretching the laminate with a tenter stretching machine is typically adopted.

A stretching mode is not particularly limited, and may be an in-air stretching mode, or may be an underwater stretching mode. Of those, an underwater stretching mode is preferred. According to the underwater stretching mode, the stretching can be performed at a temperature lower than the glass transition temperature (typically about 80° C.) of the resin substrate or the PVA-based resin layer, and hence the PVA-based resin layer can be stretched at a high ratio while its crystallization is suppressed. As a result, a polarizer having excellent optical characteristics can be produced.

The stretching of the laminate may be performed in one stage, or may be performed in a plurality of stages. When the stretching is performed in a plurality of stages, for example, the free-end stretching and the fixed-end stretching may be combined, or the underwater stretching mode and the in-air stretching mode may be combined. In addition, when the stretching is performed in the plurality of stages, the stretching ratio (maximum stretching ratio) of the laminate to be described later is the product of stretching ratios at the respective stages.

The stretching temperature of the laminate may be set to any appropriate value in accordance with, for example, the formation material for the resin substrate and the stretching mode. When the in-air stretching mode is adopted, the stretching temperature is preferably equal to or more than the glass transition temperature (Tg) of the resin substrate, more preferably equal to or more than the glass transition temperature (Tg) of the resin substrate+10° C., particularly preferably equal to or more than Tg+15° C. Meanwhile, the stretching temperature of the laminate is preferably 170° C. or less. When the stretching is performed at such temperature, rapid progress of the crystallization of the PVA-based resin is suppressed, and hence an inconvenience due to the crystallization (e.g., the inhibition of the orientation of the PVA-based resin layer by the stretching) can be suppressed.

When the underwater stretching mode is adopted, the liquid temperature of a stretching bath is preferably from 40° C. to 85° C., more preferably from 50° C. to 85° C. At such temperature, the stretching can be performed at a high ratio while the dissolution of the PVA-based resin layer is suppressed. Specifically, as described above, the glass transition temperature (Tg) of the resin substrate is preferably 60° C. or more in relation to the formation of the PVA-based resin layer. In this case, when the stretching temperature is less than 40° C., there is a risk in that the stretching cannot be satisfactorily performed even in consideration of the plasticization of the resin substrate by water. Meanwhile, as the temperature of the stretching bath increases, there is a risk in that the solubility of the PVA-based resin layer is raised and hence excellent optical characteristics cannot be obtained. The time period for which the laminate is immersed in the stretching bath is preferably from 15 seconds to 5 minutes.

When the underwater stretching mode is adopted, the laminate is preferably stretched while being immersed in an aqueous solution of boric acid (boric acid underwater stretching). The use of the aqueous solution of boric acid as the stretching bath can impart, to the PVA-based resin layer, rigidity enabling the layer to withstand a tension to be applied at the time of the stretching and water resistance preventing the layer from dissolving in water. Specifically, boric acid can produce a tetrahydroxyboric acid anion in the aqueous solution to cross-link with the PVA-based resin through a hydrogen bond. As a result, the rigidity and the water resistance are imparted to the PVA-based resin layer, and hence the layer can be satisfactorily stretched. Accordingly, a polarizer having excellent optical characteristics can be produced.

The aqueous solution of boric acid is preferably obtained by dissolving boric acid and/or a borate in water serving as a solvent. The concentration of boric acid is preferably from 1 part by weight to 10 parts by weight with respect to 100 parts by weight of water. The setting of the boric acid concentration to 1 part by weight or more can effectively suppress the dissolution of the PVA-based resin layer, and hence enables the production of a polarizer having higher characteristics. In addition to boric acid or the borate, an aqueous solution obtained by dissolving, for example, a boron compound, such as borax, and glyoxal or glutaraldehyde in a solvent may also be used.

When the PVA-based resin layer is caused to adsorb a dichromatic substance (typically iodine) by dyeing to be described later in advance, the stretching bath (aqueous solution of boric acid) is preferably compounded with an iodide. The compounding of the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably from 0.05 part by weight to 15 parts by weight, more preferably from 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (boric acid underwater stretching). The term "maximum stretching ratio" as used herein refers to a stretching ratio immediately before the rupture of the laminate, and refers to a value lower than a separately determined value for the stretching ratio at which the laminate is ruptured by 0.2.

In a preferred embodiment, after the laminate has been subjected to in-air stretching at a high temperature (of, for example, 95° C. or more), the boric acid underwater stretching and the dyeing to be described later are performed. Such in-air stretching is hereinafter referred to as "in-air auxiliary stretching" because the stretching may be regarded as stretching preliminary or auxiliary to the boric acid underwater stretching.

When the in-air auxiliary stretching is combined with the boric acid underwater stretching, the laminate can be stretched at a higher ratio in some cases. As a result, a polarizer having more excellent optical characteristics (e.g., a polarization degree) can be produced. For example, when a polyethylene terephthalate-based resin is used as the resin substrate, in the case where the in-air auxiliary stretching and the boric acid underwater stretching are combined, the laminate can be stretched while the orientation of the resin substrate is suppressed to a large extent as compared to the case where the stretching is performed only by the boric acid underwater stretching. As the orientation property of the resin substrate is improved, a stretching tension increases, and hence it becomes difficult to stably stretch the laminate or the laminate is ruptured. Accordingly, when the laminate is stretched while the orientation of the resin substrate is suppressed, the laminate can be stretched at a higher ratio.

In addition, when the in-air auxiliary stretching is combined with the boric acid underwater stretching, the orientation property of the PVA-based resin is improved, and hence the orientation property of the PVA-based resin can be improved even after the boric acid underwater stretching. Specifically, the following assumption is made: when the orientation property of the PVA-based resin is improved by the in-air auxiliary stretching in advance, the PVA-based resin easily cross-links with boric acid at the time of the boric acid underwater stretching, and the laminate is stretched under a state in which boric acid serves as a node, and hence the orientation property of the PVA-based resin is improved even after the boric acid underwater stretching. As a result, a polarizer having excellent optical characteristics (e.g., a polarization degree) can be produced.

The stretching ratio of the laminate in the in-air auxiliary stretching is preferably 3.5 times or less. The stretching temperate of the laminate in the in-air auxiliary stretching is preferably equal to or more than the glass transition temperature of the PVA-based resin. The stretching temperature is preferably from 95° C. to 150° C. The maximum stretching ratio of the laminate when the in-air auxiliary stretching and the boric acid underwater stretching are combined is preferably 5.0 times or more, more preferably 5.5 times or more, still more preferably 6.0 times or more with respect to the original length of the laminate.

C-1-3. Dyeing

The dyeing is typically performed by causing the PVA-based resin layer to adsorb the dichromatic substance (preferably iodine). A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the laminate.

The dyeing liquid is preferably an aqueous solution of iodine. The compounding amount of iodine is preferably from 0.1 part by weight to 0.5 part by weight with respect to 100 parts by weight of water. In order to increase the solubility of iodine in water, the aqueous solution of iodine is preferably compounded with an iodide. Specific examples of the iodide are as described above. The compounding amount of the iodide is preferably from 0.02 part by weight to 20 parts by weight, more preferably from 0.1 part by weight to 10 parts by weight with respect to 100 parts by weight of water. The liquid temperature of the dyeing liquid at the time of the dyeing is preferably from 20° C. to 50° C. so that the dissolution of the PVA-based resin layer may be suppressed. When the PVA-based resin layer is immersed in the dyeing liquid, an immersion time is preferably from 5 seconds to 5 minutes so that the transmittance of the PVA-based resin layer may be secured. In addition, the dyeing conditions (the concentrations, the liquid temperature, and the immersion time) may be set so that the polarization degree or single layer transmittance of the polarizer to be finally obtained may fall within a predetermined range. In one embodiment, the immersion time is set so that the polarization degree of the polarizer to be obtained may be 99.98% or more. In another embodiment, the immersion time is set so that the single layer transmittance of the polarizer to be obtained may be from 40% to 44%.

A dyeing treatment may be performed at any appropriate timing. When the underwater stretching is performed, the dyeing treatment is preferably performed before the underwater stretching.

C-1-4. Other Treatments

The laminate may be appropriately subjected to a treatment for turning its PVA-based resin layer into a polarizer (or a polarizer intermediate) in addition to the stretching and the dyeing. Examples of the treatment for turning the layer into the polarizer include an insolubilizing treatment, a cross-linking treatment, a washing treatment, and a drying treatment. The number of times of each of those treatments, the order in which the treatments are performed, and the like are not particularly limited.

The insolubilizing treatment is typically performed by immersing the PVA-based resin layer in an aqueous solution of boric acid. The performance of the insolubilizing treatment can impart water resistance to the PVA-based resin layer. The concentration of the aqueous solution of boric acid is preferably from 1 part by weight to 4 parts by weight with respect to 100 parts by weight of water. The liquid temperature of the insolubilizing bath (aqueous solution of boric acid) is preferably from 20° C. to 50° C. The insolubilizing treatment is preferably performed before the underwater stretching and the dyeing treatment.

The cross-linking treatment is typically performed by immersing the PVA-based resin layer in an aqueous solution of boric acid. The performance of the cross-linking treatment can impart water resistance to the PVA-based resin layer. The concentration of the aqueous solution of boric acid is preferably from 1 part by weight to 5 parts by weight with respect to 100 parts by weight of water. In addition, when the cross-linking treatment is performed after the dyeing treatment, the solution is preferably further compounded with an iodide. The compounding of the solution with the iodide can suppress the elution of iodine that the PVA-based resin layer has been caused to adsorb. The compounding amount of the iodide is preferably from 1 part by weight to 5 parts by weight with respect to 100 parts by weight of water. Specific examples of the iodide are as described above. The liquid temperature of the cross-linking bath (aqueous solution of boric acid) is preferably from 20° C. to 60° C. The cross-linking treatment is preferably performed before the underwater stretching. In a preferred embodiment, the dyeing treatment, the cross-linking treatment, and the underwater stretching are performed in the stated order.

The washing treatment is typically performed by immersing the PVA-based resin layer in an aqueous solution of potassium iodide. A drying temperature in the drying treatment is preferably from 30° C. to 100° C.

The polarizer (polarizer intermediate) is formed on the resin substrate as described above. The bonding of a protective film and/or the peeling of the resin substrate are/is performed as required. In one embodiment, the protective film is bonded to the polarizer surface of the laminate of the resin substrate and the polarizer by the roll-to-roll process, and then the resin substrate is peeled. Thus, a laminate (polarizing plate) of the polarizer and the protective film is obtained. The protective film in the polarizing plate may typically correspond to the protective film (protective film on the image display apparatus side) 120 of FIG. 5. As described above, the protective film may have an optical compensation function. Here, the polarizer intermediate means a polarizer before the formation of the non-polarization portions, and is meant to be distinguished from the polarizer of the present invention having the non-polarization portions. Therefore, herein, the polarizer intermediate may be simply referred to as "polarizer" contextually. A person skilled in the art can easily understand whether the term "polarizer" means the polarizer intermediate or means the polarizer of the present invention with reference to the description given herein.

C-2. Formation of Non-Polarization Portions

Next, the polarizer of the present invention is obtained by forming non-polarization portions at predetermined positions of the polarizer intermediate obtained in the section C-1. When the polarizer (polarizer intermediate) is formed from the PVA-based resin layer applied onto the resin substrate, the laminate of the resin substrate and the polarizer, or the laminate (polarizing plate) of the protective film and the polarizer is typically subjected to the formation of the non-polarization portions. When the polarizer (polarizer intermediate) is a single resin film, the polarizer alone, or the laminate (polarizing plate) of the protective film and the polarizer is typically subjected to the formation of the non-polarization portions. The formation of the non-polarization portions is specifically described below. The case where the non-polarization portions are formed in the polarizer (polarizer intermediate) by decoloring based on a chemical treatment (hereinafter sometimes referred to as "chemical decoloring treatment") in the laminate of the protective film and the polarizer (hereinafter simply referred to as "polarizing plate" in this section) is described as a typical example. It is apparent to a person skilled in the art that the same procedure is applicable also to a polarizer intermediate having any other construction (e.g., a polarizer intermediate that is a single resin film).

Figure 6:
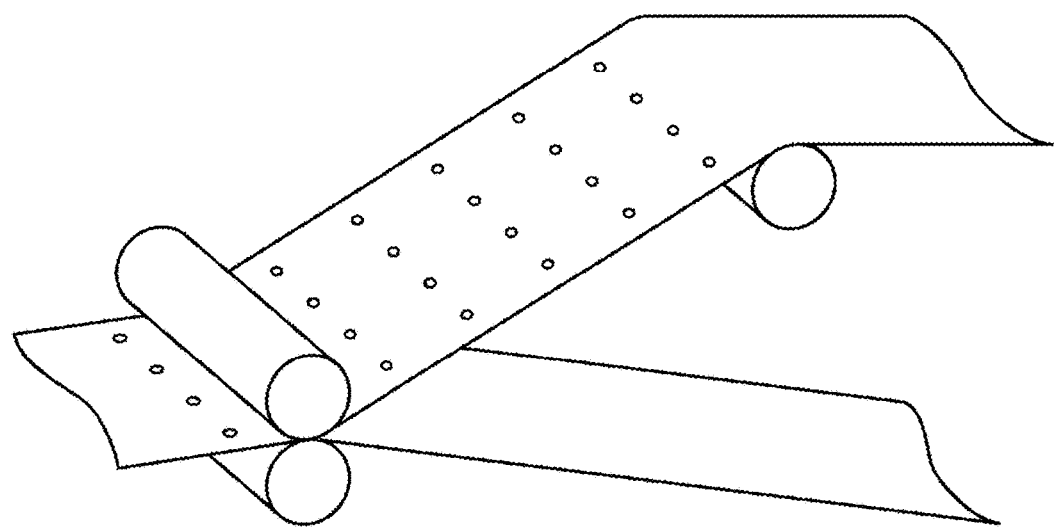
FIG. 6 is a schematic perspective view for illustrating bonding between a polarizer and a first surface protective film in a method of producing a polarizer according to an embodiment of the present invention.

As illustrated in FIG. 6, a surface protective film having through-holes arranged according to a predetermined pattern is bonded to a surface of the polarizing plate on the polarizer side by the roll-to-roll process. The term "roll-to-roll process" as used herein means that roll-shaped films are bonded to each other with their lengthwise directions aligned with each other while being conveyed. The surface protective film having the through-holes is bonded to the polarizer through intermediation of any appropriate pressure-sensitive adhesive in a peelable manner. When the surface protective film having the through-holes is used, a decoloring treatment based on immersion in a decoloring liquid can be performed, and hence the polarizer of the present invention can be obtained with extremely high production efficiency. The surface protective film having the through-holes may be referred to as "first surface protective film" for convenience.

As described above, the first surface protective film has the through-holes arranged according to the predetermined pattern. The positions at which the through-holes are arranged correspond to the positions of the polarizer (polarizer intermediate) at which the non-polarization portions are formed. The arrangement pattern of the through-holes illustrated in FIG. 6 corresponds to the arrangement pattern of the non-polarization portions illustrated in FIG. 4A. The through-holes may each have any appropriate shape. The shapes of the through-holes correspond to the plan-view shapes of the non-polarization portions to be formed. The through-holes may each be formed by, for example, mechanical punching (e.g., punching, chisel punching, a plotter, or a water jet) or the removal of a predetermined portion of the film (e.g., laser ablation or chemical dissolution).

The first surface protective film is preferably a film having a high hardness (e.g., a modulus of elasticity). This is because the deformation of the through-holes at the time of the conveyance and/or the bonding can be prevented. As materials for forming the first surface protective film, there are given, for example: an ester-based resin, such as a polyethylene terephthalate-based resin; a cycloolefin-based resin, such as a norbornene-based resin; an olefin-based resin, such as polypropylene; a polyamide-based resin; a polycarbonate-based resin; and copolymer resins thereof. Of those, an ester-based resin (especially a polyethylene terephthalate-based resin) is preferred. Such material has an advantage in that its modulus of elasticity is sufficiently high, and hence the deformation of the through-holes hardly occurs even when a tension is applied at the time of the conveyance and/or the bonding.

The thickness of the first surface protective film is typically from 20 μm to 250 μm, preferably from 30 μm to 150 μm. Such thickness has an advantage in that the deformation of the through-holes hardly occurs even when a tension is applied at the time of the conveyance and/or the bonding.

The modulus of elasticity of the first surface protective film is preferably from 2.2 kN/mm$^2$ to 4.8 kN/mm$^2$. When the modulus of elasticity of the first surface protective film falls within such range, the following advantage is obtained: the deformation of the through-holes hardly occurs even when a tension is applied at the time of the conveyance and/or the bonding. The modulus of elasticity is measured in conformity with JIS K 7161.

The tensile elongation of the first surface protective film is preferably from 90% to 170%. When the tensile elongation of the first surface protective film falls within such range, the following advantage is obtained: the film is hardly ruptured during the conveyance. The tensile elongation is measured in conformity with JIS K 7161.

Meanwhile, a second surface protective film is bonded to a surface of the polarizing plate on the protective film side by the roll-to-roll process. The second surface protective film is bonded to the protective film through intermediation of any appropriate pressure-sensitive adhesive in a peelable manner. The use of the second surface protective film enables appropriate protection of the polarizing plate (polarizer intermediate/protective film) in the decoloring treatment based on immersion. The same film as the first surface protective film except that no through-holes are arranged may be used as the second surface protective film. Further, a soft (e.g., low-modulus of elasticity) film like a polyolefin (e.g., polyethylene) film may also be used as the second surface protective film. The second surface protective film may be bonded simultaneously with the first surface protective film, may be bonded before the bonding of the first surface protective film, or may be bonded after the bonding of the first surface protective film. The second surface protective film is preferably bonded before the bonding of the first surface protective film. Such procedure has the following advantages: the protective film is prevented from being flawed; and the through-holes formed in the first surface protective film are prevented from being transferred as traces onto the protective film at the time of its winding. When the second surface protective film is bonded before the bonding of the first surface protective film, for example, the following may be performed. A laminate of the polarizer protective film and the second surface protective film is produced, and the laminate is bonded to the laminate of the resin substrate and the polarizer. After that, the resin substrate is peeled and the first surface protective film is bonded to the peeled surface.

Next, as illustrated in FIG. 7, the laminate of the first surface protective film, the polarizer (polarizer intermediate), the protective film, and the second surface protective film is subjected to the chemical decoloring treatment. The chemical decoloring treatment involves bringing the laminate into contact with a basic solution. In the case where iodine is used as a dichromatic substance, when the basic solution is brought into contact with a desired portion of the resin film, the iodine content of the contact portion can be easily reduced.

The contact between the laminate and the basic solution may be performed by any appropriate means. Typical examples thereof include: the immersion of the laminate in the basic solution; and the application or spraying of the basic solution onto the laminate. Of those, immersion is preferred. This is because of the following reason: the decoloring treatment can be performed while the laminate is conveyed as illustrated in FIG. 7, and hence production efficiency is significantly high. As described above, the use of the first surface protective film (and, as required, the second surface protective film) enables the immersion. Specifically, when the laminate is immersed in the basic solution, only portions in the polarizer (polarizer intermediate) corresponding to the through-holes of the first surface protective film are brought into contact with the basic solution. For example, in the case where the polarizer (polarizer intermediate) contains iodine as a dichromatic substance, when the polarizer (polarizer intermediate) and the basic solution are brought into contact with each other, the iodine concentrations of the contact portions of the polarizer (polarizer intermediate) with the basic solution are reduced. As a result, the non-polarization portions can be selectively formed only in the contact portions (that can be set by the through-holes of the first surface protective film). As described above, according to this embodiment, the non-polarization portions can be selectively formed in the predetermined portions of the polarizer (polarizer intermediate) with extremely high production efficiency without any complicated operation. In the case where iodine remains in the resultant polarizer, even when the non-polarization portions are formed by breaking an iodine complex, there is a risk in that the iodine complex is formed again in association with the use of the polarizer, and hence the non-polarization portions do not have desired characteristics. In this embodiment, iodine itself is removed from the polarizer (substantially the non-polarization portions) by the removal of the basic solution to be described later. As a result, changes in characteristics of the non-polarization portions in association with the use of the polarizer can be prevented. In addition, according to such contact method as described above, a recessed portion can be formed only on one surface side of the resin film. In this case, the control of the depth of the recessed portion becomes significantly easier than that in the case where recessed portions are formed on both surfaces of the resin film. As a result, it becomes easier to suppress an influence on the external appearance of the polarizer.

The formation of the non-polarization portions with the basic solution is described in more detail. After having been brought into contact with a predetermined portion of the polarizer (polarizer intermediate), the basic solution permeates into the predetermined portion. The iodine complex in the predetermined portion is reduced by a base in the basic solution to become an iodine ion. The reduction of the iodine complex to the iodine ion substantially eliminates the polarization performance of the portion and hence leads to the formation of a non-polarization portion in the portion. In addition, the reduction of the iodine complex increases the transmittance of the portion. Iodine that has become the iodine ion moves from the portion into the solvent of the basic solution. As a result, through the removal of the basic solution to be described later, the iodine ion is also removed from the portion together with the basic solution. Thus, a non-polarization portion (low-concentration portion) is selectively formed in the predetermined portion of the polarizer (polarizer intermediate), and the non-polarization portion is a stable portion that does not change with time. The permeation of the basic solution into even an undesired portion (and as a result, the formation of a non-polarization portion in the undesired portion) can be prevented by adjusting, for example, the material, thickness, and mechanical characteristics of the first surface protective film, the concentration of the basic solution, and the time period for which the laminate is immersed in the basic solution.

Any appropriate basic compound may be used as a basic compound in the basic solution. Examples of the basic compound include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; organic alkali metal salts, such as sodium acetate; and ammonia water. Of those, hydroxides of alkali metals and/or alkaline earth metals are preferably used, and sodium hydroxide, potassium hydroxide, and lithium hydroxide are more preferably used. The use of such basic compound can efficiently ionize the iodine complex, and hence can form the non-polarization portion with additional ease. Those basic compounds may be used alone or in combination thereof.

Any appropriate solvent may be used as the solvent of the basic solution. Specific examples thereof include: water; alcohols, such as ethanol and methanol; ethers; benzene; chloroform; and mixed solvents thereof. The solvent is preferably water or an alcohol because an iodine ion satisfactorily migrates to the solvent and hence the iodine ion can be easily removed in the subsequent removal of the basic solution.

The concentration of the basic solution is, for example, from 0.01 N to 5 N, preferably from 0.05 N to 3 N, more preferably from 0.1 N to 2.5 N. When the concentration of the basic solution falls within such range, an iodine concentration in the polarizer (polarizer intermediate) can be efficiently reduced, and the ionization of the iodine complex in a portion except a predetermined portion can be prevented. Further, with such concentration, the depth of the recessed portion which can be formed is easily controlled.

The liquid temperature of the basic solution is, for example, from 20° C. to 50° C. The time period for which the laminate (substantially the predetermined portions of the polarizer intermediate) and the basic solution are brought into contact with each other may be set in accordance with the thickness of the polarizer intermediate, the kind of the basic compound in the basic solution to be used, and the concentration of the basic compound, and is, for example, from 5 seconds to 30 minutes. When the contact time falls within such range, a recessed portion having an appropriate depth can be formed.

Boric acid may be incorporated into the polarizer (resin film). Boric acid may be incorporated by bringing a boric acid solution (e.g., an aqueous solution of boric acid) into contact with the polarizer at the time of, for example, the stretching treatment or the cross-linking treatment. The boric acid content of the polarizer (resin film) is, for example, from 10 wt % to 30 wt %. In addition, a boric acid content in a contact portion with the basic solution is, for example, from 5 wt % to 12 wt %.

After the contact with the basic solution, the amount of an alkali metal and/or an alkaline earth metal in the resin film is reduced in the contact portion with which the basic solution has been brought into contact. The reduction of the amount of the alkali metal and/or the alkaline earth metal can provide a low-concentration portion excellent in dimensional stability. Specifically, the shapes of the low-concentration portions formed by the contact with the basic solution can be maintained as they are even under a humidified environment.

When the basic solution is brought into contact with the resin film, a hydroxide of the alkali metal and/or the alkaline earth metal may remain in the contact portion. In addition, when the basic solution is brought into contact with the resin film, a metal salt of the alkali metal and/or the alkaline earth metal may be produced in the contact portion. The hydroxide or the metal salt may produce a hydroxide ion, and the produced hydroxide ion may act on (decompose or reduce) a dichromatic substance (e.g., an iodine complex) present around the contact portion to expand a non-polarization region (low-concentration region). Therefore, it is assumed that when the amount of the salt of the alkali metal and/or the alkaline earth metal is reduced, the expansion of the non-polarization region with time is suppressed and hence desired shapes of the non-polarization portions can be maintained.

The metal salt that may produce a hydroxide ion is, for example, a borate. The borate may be produced by the neutralization of boric acid in the resin film with a basic solution (a solution of a hydroxide of an alkali metal and/or a hydroxide of an alkaline earth metal). For example, when the polarizer is placed under a humidified environment, the borate (metaborate) may be hydrolyzed to produce a hydroxide ion as represented by the following formulae.

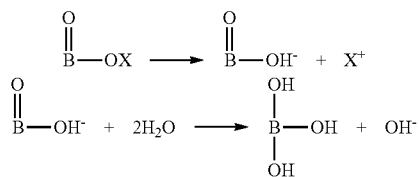

In the formulae, X represents an alkali metal or an alkaline earth metal.

The content of the alkali metal and/or the alkaline earth metal in the contact portion is preferably reduced so that the content may be 3.6 wt % or less, preferably 2.5 wt % or less, more preferably 1.0 wt % or less, still more preferably 0.5 wt % or less.

The alkali metal and/or the alkaline earth metal may be incorporated into the resin film in advance by subjecting the film to various treatments for turning the film into a polarizer. For example, potassium may be incorporated into the resin film by bringing a solution of an iodide, such as potassium iodide, into contact with the film. The alkali metal and/or the alkaline earth metal to be typically incorporated into the polarizer as described above may not adversely affect the dimensional stability of each of the low-concentration portions.

A method involving bringing a treatment liquid into contact with the contact portion with the basic solution is preferably used as a method for the reduction. Such method can cause the alkali metal and/or the alkaline earth metal to migrate from the resin film to the treatment liquid to reduce the content.

Any appropriate method may be adopted as a method for the contact of the treatment liquid. Examples thereof include: a method involving dropping, applying, or spraying the treatment liquid onto the contact portion with the basic solution; and a method involving immersing the contact portion with the basic solution in the treatment liquid.

When the resin film is protected with any appropriate protective material at the time of the contact of the basic solution, the treatment liquid is preferably brought into contact with the film as it is (particularly in the case where the temperature of the treatment liquid is 50° C. or more). Such mode can prevent deterioration in polarization characteristics due to the treatment liquid in a portion other than the contact portion with the basic solution.

The treatment liquid may contain any appropriate solvent. Examples of the solvent include: water; alcohols, such as ethanol and methanol; ethers; benzene; chloroform; and mixed solvents thereof. Of those, water or an alcohol is preferably used from the viewpoint that the alkali metal and/or the alkaline earth metal are/is caused to efficiently migrate. Any appropriate water may be used as water. Examples thereof include tap water, pure water, and deionized water.

The temperature of the treatment liquid at the time of the contact is, for example, 20° C. or more, preferably 50° C. or more, more preferably 60° C. or more, still more preferably 70° C. or more. Such temperature can cause the alkali metal and/or the alkaline earth metal to efficiently migrate to the treatment liquid. Specifically, the temperature can significantly increase the swelling ratio of the resin film to physically remove the alkali metal and/or the alkaline earth metal in the resin film. Meanwhile, the temperature of the treatment liquid is substantially 95° C. or less.

The time period for which the contact portion and the treatment liquid are brought into contact with each other may be appropriately adjusted in accordance with, for example, the method for the contact, the temperature of the treatment liquid (water), and the thickness of the resin film. For example, when the contact portion is immersed in warm water, the contact time is preferably from 10 seconds to 30 minutes, more preferably from 30 seconds to 15 minutes, still more preferably from 60 seconds to 10 minutes.

In one embodiment, an acidic solution is used as the treatment liquid. The use of the acidic solution can neutralize the hydroxide of the alkali metal and/or the alkaline earth metal remaining in the resin film to chemically remove the alkali metal and/or the alkaline earth metal in the resin film.

Any appropriate acidic compound may be used as an acidic compound in the acidic solution. Examples of the acidic compound include: inorganic acids, such as hydrochloric acid, sulfuric acid, nitric acid, hydrogen fluoride, and boric acid; and organic acids, such as formic acid, oxalic acid, citric acid, acetic acid, and benzoic acid. Of those, an inorganic acid is preferred as the acidic compound in the acidic solution, and hydrochloric acid, sulfuric acid, or nitric acid is more preferred. Those acidic compounds may be used alone or in combination thereof.

It is preferred that an acidic compound having an acidity stronger than that of boric acid be used as the acidic compound. This is because the compound can act also on the metal salt (borate) of the alkali metal and/or the alkaline earth metal. Specifically, the alkali metal and/or the alkaline earth metal in the resin film can be chemically removed by liberating boric acid from the borate.

An indicator of the acidity is, for example, an acid dissociation constant (pKa), and an acidic compound having a pKa smaller than the pKa (9.2) of boric acid is preferably used. Specifically, the pKa is preferably less than 9.2, more preferably 5 or less. The pKa may be measured with any appropriate measuring apparatus, and reference may be made to a value described in a literature, such as "Chemical Handbook Fundamentals revised 5th edition" (edited by The Chemical Society of Japan, Maruzen Publishing Co., Ltd.). In addition, in the case of an acidic compound that dissociates in a plurality of stages, its pKa value may change in each stage. When such acidic compound is used, such a compound that any one of the pKa values in the respective stages falls within the above-mentioned range is used. The pKa as used herein refers to a value in an aqueous solution at 25° C.

A difference between the pKa of the acidic compound and the pKa of boric acid is, for example, 2.0 or more, preferably from 2.5 to 15, more preferably from 2.5 to 13. When the difference falls within such range, the alkali metal and/or the alkaline earth metal can be caused to efficiently migrate to the treatment liquid, and as a result, a desired content of the alkali metal and/or the alkaline earth metal in each of the low-concentration portions can be achieved.

Examples of the acidic compound that may satisfy the above-mentioned pKa include: inorganic acids, such as hydrochloric acid (pKa: −3.7), sulfuric acid ($pK_2$: 1.96), nitric acid (pKa: −1.8), hydrogen fluoride (pKa: 3.17), and boric acid (pKa: 9.2); and organic acids, such as formic acid (pKa: 3.54), oxalic acid ($pK_1$: 1.04, $pK_2$: 3.82), citric acid ($pK_1$: 3.09, $pK_2$: 4.75, $pK_3$: 6.41), acetic acid (pKa: 4.8), and benzoic acid (pKa: 4.0).

The solvent of the acidic solution (treatment liquid) is as described above, and also in this embodiment in which the acidic solution is used as the treatment liquid, the physical removal of the alkali metal and/or the alkaline earth metal in the resin film may occur.

The concentration of the acidic solution is, for example, from 0.01 N to 5 N, preferably from 0.05 N to 3 N, more preferably from 0.1 N to 2.5 N.

The liquid temperature of the acidic solution is, for example, from 20° C. to 50° C. The time period for which the resin film is brought into contact with the acidic solution may be set in accordance with the thickness of the resin film, the kind of the acidic compound, and the concentration of the acidic solution, and is, for example, from 5 seconds to 30 minutes.

The resin film may be further subjected to any appropriate other treatment in addition to the above-mentioned treatments. Examples of the other treatment include the removal of the basic solution and/or the acidic solution, and washing.

A method for the removal of the basic solution and/or the acidic solution is specifically, for example, removal by wiping with a waste cloth or the like, removal by suction, natural drying, heat drying, blow drying, or vacuum drying. The drying temperature is, for example, from 20° C. to 100° C. The drying time is, for example, from 5 seconds to 600 seconds.

The washing treatment is performed by any appropriate method. Examples of a solution to be used in the washing treatment include pure water, alcohols, such as methanol and ethanol, an acidic aqueous solution, and mixed solvents thereof. The washing is typically performed while the laminate is conveyed as illustrated in FIG. 7. The washing treatment may be performed at any appropriate stage. The washing treatment may be performed a plurality of times.

After the non-polarization portions have been formed as described above, the first surface protective film and the second surface protective film may be typically peeled and removed.

Thus, the non-polarization portions are formed at predetermined positions of the elongated polarizer (polarizer intermediate) according to a predetermined arrangement pattern, and hence the elongated polarizer according to the embodiment of the present invention can be obtained. As described above, a sheet-shaped polarizer can be obtained by, for example, cutting the elongated polarizer into a predetermined size.

D. Image Display Apparatus

An image display apparatus of the present invention includes the polarizer. The polarizer is cut in accordance with the size of the image display apparatus. Examples of the image display apparatus include a liquid crystal display apparatus and an organic EL device. Specifically, the liquid crystal display apparatus includes a liquid crystal panel including: a liquid crystal cell; and the polarizer arranged on one side, or each of both sides, of the liquid crystal cell. The organic EL device includes an organic EL panel including the polarizer arranged on a viewer side. The polarizer is arranged so that its non-polarization portion may correspond to a camera portion of the image display apparatus.

EXAMPLES

Now, the present invention is specifically described byway of Examples. However, the present invention is not limited to these Examples.

Example 1

An amorphous isophthalic acid-copolymerized polyethylene terephthalate (IPA-copolymerized PET) film of an elongated shape (thickness: 100 μm) having a water absorption ratio of 0.75% and a Tg of 75° C. was used as a resin substrate. One surface of the substrate was subjected to a corona treatment, and an aqueous solution containing polyvinyl alcohol (polymerization degree: 4,200, saponification degree: 99.2 mol %) and acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z-200") at a ratio of 9:1 was applied to the corona-treated surface and dried at 25° C. to form a PVA-based resin layer having a thickness of 11 μm. Thus, a laminate was produced.

The resultant laminate was subjected to free-end uniaxial stretching in an oven at 120° C. between rolls having different peripheral speeds in a longitudinal direction (lengthwise direction) at 2.0 times (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. while an iodine concentration and an immersion time were adjusted so that a polarizing plate to be obtained had a predetermined transmittance. In this example, the laminate was immersed in an aqueous solution of iodine, which was obtained by compounding 100 parts by weight of water with 0.2 part by weight of iodine and 1.5 parts by weight of potassium iodide, for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, the laminate was subjected to uniaxial stretching between rolls having different peripheral speeds in a longitudinal direction (lengthwise direction) so that a total stretching ratio became 5.5 times while being immersed in an aqueous solution of boric acid having a liquid temperature of 70° C. (an aqueous solution obtained by compounding 100 parts by weight of water with 4 parts by weight of boric acid and 5 parts by weight of potassium iodide) (underwater stretching).

After that, the laminate was immersed in a washing bath having a liquid temperature of 30° C. (an aqueous solution obtained by compounding 100 parts by weight of water with 4 parts by weight of potassium iodide) (washing treatment).

Subsequently, a PVA-based resin aqueous solution (manufactured by The Nippon Synthetic Chemical Industry Co., Ltd., trade name: "GOHSEFIMER (trademark) Z-200", resin concentration: 3 wt %) was applied to the PVA-based resin layer surface of the laminate, and a protective film (thickness: 25 μm) was bonded thereto, followed by the heating of the resultant in an oven maintained at 60° C. for 5 minutes. After that, the substrate was peeled from the PVA-based resin layer. Thus, an elongated polarizing plate having a width of 1,200 mm and a length of 43 m (polarizer having a thickness of 5 μm (single layer transmittance: 42.3%)/protective film) was obtained.

A pressure-sensitive adhesive (acrylic pressure-sensitive adhesive) was applied to one surface of an ester-based resin film (thickness: 38 μm) having a width of 1,200 mm and a length of 43 m so as to have a thickness of 5 μm. Throughholes each having a diameter of 2.8 mm were formed in the ester-based resin film with the pressure-sensitive adhesive by using a pinnacle blade every 250 mm in its lengthwise direction and every 400 mm in its widthwise direction.

The ester-based resin film with the pressure-sensitive adhesive was bonded to the polarizer side of the resultant polarizing plate having a total thickness of 30 μm by a roll-to-roll process, and the resultant was immersed in a 1 mol/L (1 N) aqueous solution of sodium hydroxide for 30 seconds. Next, the resultant was immersed in 1 mol/L (1 N) hydrochloric acid for 10 seconds. After that, the resultant was dried at 60° C. Thus, transparent portions were formed in the polarizer.

Example 2

A PVA film having a thickness of 60 μm (manufactured by Kuraray Co., Ltd., PE6000) was immersed in an aqueous solution at 30° C. for 30 seconds (swelling step).

Next, the PVA film was immersed in a dyeing bath having a liquid temperature of 30° C. while an iodine concentration and an immersion time were adjusted so that a polarizing plate to be obtained had a predetermined transmittance. In this example, the PVA film was immersed in an aqueous solution of iodine obtained by compounding 100 parts by weight of water with 0.15 part by weight of iodine and 1.0 part by weight of potassium iodide for 60 seconds (dyeing treatment).

Next, the PVA film was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the PVA film was uniaxially stretched in its longitudinal direction (lengthwise direction) at 5.5 times between rolls having different peripheral speeds while being immersed in an aqueous solution of boric acid having a liquid temperature of 70° C. (aqueous solution obtained by compounding 100 parts by weight of water with 4 parts by weight of boric acid and 5 parts by weight of potassium iodide) (underwater stretching).

After that, the PVA film was immersed in a washing bath having a liquid temperature of 30° C. (aqueous solution obtained by compounding 100 parts by weight of water with 4 parts by weight of potassium iodide) (washing treatment).

After the washing, an aqueous solution of a PVA-based resin (manufactured by The Nippon Synthetic Chemical Industry Co., Ltd., trade name: "GOHSEFIMER (trademark) Z-200", resin concentration: 3 wt %) was applied to one surface of the PVA film, a triacetylcellulose film (manufactured by Konica Minolta, Inc., trade name: "KC4UY", thickness: 40 µm) was bonded thereto, and the resultant was heated in an oven maintained at 60° C. for 5 minutes. Thus, a polarizing plate including a polarizer having a thickness of 22 µm (single layer transmittance: 42.5%), the polarizing plate having a width of 1,200 mm and a length of 43 m, was produced.

The above-mentioned ester-based resin film with the pressure-sensitive adhesive having formed there in the through-holes was bonded to the polarizer surface of the resultant polarizing plate by a roll-to-roll process, and the resultant was immersed in a 1 mol/L (1 N) aqueous solution of sodium hydroxide for 180 seconds. Next, the resultant was immersed in 1 mol/L (1 N) hydrochloric acid for 60 seconds. After that, the resultant was dried at 60° C. Thus, transparent portions were formed in the polarizer.

The transparent portions of the polarizing plates of Examples 1 and 2 were each evaluated for the following items.

1. Transmittance (Ts)

Measurement was performed with a spectrophotometer (manufactured by Murakami Color Research Laboratory, product name: "DOT-3"). A transmittance (T) is a Y value subjected to visibility correction with the two-degree field of view (C light source) of JIS Z 8701-1982.

2. Iodine Content

An iodine content in each of the transparent portions of a polarizer was determined by X-ray fluorescence analysis. Specifically, the iodine content of the polarizer was determined from a calibration curve produced in advance from an X-ray intensity measured under the following conditions through the use of a standard sample.

Analysis apparatus: manufactured by Rigaku Corporation, X-ray fluorescence (XRF) analysis apparatus, product name "ZSX100e"
Anticathode: rhodium
Dispersive crystal: lithium fluoride
Excitation light energy: 40 kV-90 mA
Iodine measured line: I-LA
Quantification method: FP method
$2\theta$ angle peak: 103.078 deg (iodine)
Measurement time: 40 seconds The transparent portions of the polarizing plates obtained in Examples 1 and 2 had transmittances of 90.3% (Example 1) and 90.2% (Example 2), and iodine contents of 0.08 wt % (Example 1) and 0.12 wt % (Example 2), respectively. The iodine content of a portion other than the transparent portions of each of the polarizers was about 5 wt %, and hence in each of Examples 1 and 2, transparent portions capable of functioning as non-polarization portions, the portions each having a dichromatic substance content lower than that of any other portion, were formed.

3. Sodium Content

A sodium content in each of the transparent portions of a polarizer was determined by X-ray fluorescence analysis. Specifically, the sodium content of the polarizer was determined from a calibration curve produced in advance from an X-ray intensity measured under the following conditions through the use of a standard sample. The measurement of the sodium content was performed before the immersion in hydrochloric acid and after the immersion.

Analysis apparatus: manufactured by Rigaku Corporation, X-ray fluorescence (XRF) analysis apparatus, product name "ZSX100e"
Anticathode: rhodium
Dispersive crystal: lithium fluoride
Excitation light energy: 40 kV-90 mA
Sodium measured line: Na-KA
Quantification method: FP method
Measurement time: 40 seconds In the polarizing plate of Example 1, the sodium content of each of the transparent portions before the immersion in hydrochloric acid was 4.0 wt %, and the content after the immersion was 0.04 wt %. In addition, in the polarizing plate of Example 2, the sodium content of each of the transparent portions before the immersion in hydrochloric acid was 4.1 wt %, and the content after the immersion was 0.05 wt %.

In addition, the polarizing plates obtained in Examples 1 and 2 were each placed under an environment at 65° C. and 90% RH for 500 hours. As a result, in each of Examples 1 and 2, no large changes in sizes of the transparent portions after a humidity test as compared to the sizes before the test were observed. The same humidity test was performed on each of polarizing plates produced in the same manner as in Examples 1 and 2 except that the immersion in hydrochloric acid was not performed. As a result, in each of the polarizing plates, the sizes of transparent portions each increased by a factor of about 1.3.

Further, surface smoothness near each of the transparent portions of the polarizing plates of Examples 1 and 2 was measured with an optical measuring instrument "ZYGO New View 7300" manufactured by Canon Inc. The result of the evaluation of the surface smoothness (size of unevenness) of Example 1 is shown in FIG. 8(a), and the result of the evaluation of the surface smoothness of Example 2 is shown in FIG. 8(b). In Example 1 in which the thickness of the polarizer was 5 µm, a step between the transparent portion (recessed portion) and the other portion was 0.8 µm or less, which was significantly smaller than that in Example 2 in which the thickness of the polarizer was 22 µm, and hence the surface smoothness was significantly satisfactory.

4. External Appearance

The external appearance of each of the polarizing plates of Examples 1 and 2 was visually observed. As a result, the recess of the transparent portion was viewed in the polarizing plate of Example 2.

INDUSTRIAL APPLICABILITY

The polarizer of the present invention is suitably used in an image display apparatus (a liquid crystal display apparatus or an organic EL device) with a camera of, for example, a cellular phone, such as a smart phone, a notebook PC, or a tablet PC.

REFERENCE SIGNS LIST 10 resin film
20 non-polarization portion 100 polarizer
101 polarizer
110 protective film
120 protective film
130 pressure-sensitive adhesive layer
132 separator
300 polarizing plate

The invention claimed is:

1. A polarizer, wherein:
the polarizer is a resin film comprising a dichroic substance and has a non-polarization portion at a predetermined position;
the non-polarization portion comprises a thin-walled portion thinner than another portion of the resin film, a step formed between the thin-walled portion and another portion of the resin film is 2 μm or less, and
the non-polarization portion has a content of an alkali metal and/or an alkaline earth metal of 3.6 wt % or less.

2. The polarizer according to claim 1, wherein the polarizer has a thickness of 10 μm or less.

3. The polarizer according to claim 1, wherein the non-polarization portion comprises a low-concentration portion having a content of the dichroic substance lower than that of the another portion of the resin film.

4. The polarizer according to claim 3, wherein the content of the dichroic substance of the non-polarization portion is 1.0 wt % or less.

5. The polarizer according to claim 1, wherein the non-polarization portion has a content of the dichroic substance of 1.0 wt % or less.

6. The polarizer according to claim 1, wherein the non-polarization portion has a transmittance of 50% or more.

7. The polarizer according to claim 1, wherein the non-polarization portion has a transmittance of 90% or more.

8. The polarizer according to claim 1, wherein the resin film comprises a polyvinyl alcohol-based resin film containing iodine.

9. A polarizing plate, comprising:
the polarizer of claim 1; and
a protective film arranged on at least one side of the polarizer.

10. An image display apparatus, comprising the polarizer of claim 1, wherein the non-polarization portion is arranged at a position corresponding to a camera portion.

11. An image display apparatus, comprising the polarizing plate of claim 9, wherein the non-polarization portion is arranged at a position corresponding to a camera portion.

12. A polarizer, wherein:
the polarizer is a polyvinyl alcohol-based resin film comprising iodine, having a thickness of 10 μm or less and has a non-polarization portion at a predetermined position;
the non-polarization portion comprises a thin-walled portion thinner than another portion of the resin film, a step formed between the thin-walled portion and another portion of the resin film is 2 μm or less;
the non-polarization portion has a content of iodine of 1.0 wt % or less and has a content of an alkali metal and/or an alkaline earth metal of 3.6 wt % or less; and
the non-polarization portion has a transmittance of 50% or more.

13. The polarizer according to claim 1, wherein the polarizer has a thickness of 5 μm or less.

14. The polarizer according to claim 12, wherein the polarizer has a thickness of 5 μm or less.

* * * * *